US010914168B2

(12) United States Patent
Elbadawy et al.

(10) Patent No.: US 10,914,168 B2
(45) Date of Patent: Feb. 9, 2021

(54) SYSTEM FOR ACOUSTIC NAVIGATION OF BOREHOLES

(71) Applicant: HYPERSCIENCES, INC., Spokane, WA (US)

(72) Inventors: Hossam Elbadawy, Katy, TX (US); Mark C. Russell, Spokane, WA (US); Charles T. Russell, Spokane, WA (US); Timothy John Elder, Seattle, WA (US); Minh Button, Spokane, WA (US)

(73) Assignee: HYPERSCIENCES, INC., Spokane, WA (US)

( * ) Notice: Subject to any disclaimer, the term of this patent is extended or adjusted under 35 U.S.C. 154(b) by 258 days.

(21) Appl. No.: 15/871,824

(22) Filed: Jan. 15, 2018

(65) Prior Publication Data

US 2018/0202288 A1    Jul. 19, 2018

Related U.S. Application Data

(60) Provisional application No. 62/447,350, filed on Jan. 17, 2017, provisional application No. 62/450,529, filed on Jan. 25, 2017.

(51) Int. Cl.
    *E21B 47/14*      (2006.01)
    *E21B 49/04*      (2006.01)
    (Continued)

(52) U.S. Cl.
CPC .............. *E21B 47/14* (2013.01); *E21B 7/007* (2013.01); *E21B 7/04* (2013.01); *E21B 41/0085* (2013.01);
(Continued)

(58) Field of Classification Search
CPC .......... E21B 47/14; E21B 7/007; E21B 49/04; G01V 1/04; G01V 1/104; F24T 10/17; F24T 2201/00
See application file for complete search history.

(56) References Cited

U.S. PATENT DOCUMENTS 2,544,573 A * 3/1951 Price .................... E21B 7/007
                                                         175/4.5
3,516,502 A * 6/1970 Bennett .................. E21B 7/007
                                                         175/4.5

(Continued)

FOREIGN PATENT DOCUMENTS

WO      2016043723 A1     3/2016

OTHER PUBLICATIONS

Young, Lee W., "International Search Report and Written Opinion dated Jun. 29, 2018", Patent Cooperation Treaty Application No. PCT/US18/13833, Patent Cooperation Treaty, Jun. 29, 2018.

(Continued)

*Primary Examiner* — Blake E Michener
(74) *Attorney, Agent, or Firm* — Lindauer Law, PLLC

(57) ABSTRACT

Methods for generating boreholes used for generating geothermal energy or other purposes include forming the borehole by accelerating a projectile into contact with geologic material. Interaction between the projectile and the geologic material generates an acoustic signal, such as vibrations within the formation, that is detected using acoustic sensors along a drilling conduit, at the surface, or within a separate borehole. Characteristics of the geologic material, such as hardness, porosity, or the presence of fractures, may be determined based on characteristics of the acoustic signal. The direction in which the borehole is extended may be modified based on the characteristics of the geologic material, such as to create a borehole that intersects one or more fractures for generation of geothermal energy.

20 Claims, 9 Drawing Sheets

(51) Int. Cl.
| | |
|---|---|
| *E21B 7/04* | (2006.01) |
| *E21B 7/00* | (2006.01) |
| *F24T 10/17* | (2018.01) |
| *G01V 1/04* | (2006.01) |
| *F24T 10/13* | (2018.01) |
| *E21B 41/00* | (2006.01) |
| *E21B 47/07* | (2012.01) |
| *G01V 1/104* | (2006.01) |
| *F24T 10/00* | (2018.01) |

(52) U.S. Cl.
CPC .............. *E21B 47/07* (2020.05); *E21B 49/04* (2013.01); *F24T 10/13* (2018.05); *F24T 10/17* (2018.05); *G01V 1/04* (2013.01); *G01V 1/104* (2013.01); *F24T 2010/53* (2018.05); *F24T 2201/00* (2018.05); *Y02E 10/10* (2013.01)

(56) References Cited

U.S. PATENT DOCUMENTS

| | | | | |
|---|---|---|---|---|
| 3,633,686 | A * | 1/1972 | Bennett | E21B 7/007 175/4.5 |
| 3,979,724 | A * | 9/1976 | Silverman | E21B 47/02 367/36 |
| 4,004,642 | A * | 1/1977 | Dardick | E21B 4/00 175/4.5 |
| 4,030,557 | A * | 6/1977 | Alvis | E21B 7/007 175/4.5 |
| 4,106,574 | A * | 8/1978 | Dow | E21B 7/007 166/271 |
| 4,474,250 | A * | 10/1984 | Dardick | E21B 7/007 175/1 |
| 4,582,147 | A * | 4/1986 | Dardick | E21B 7/007 175/1 |
| 4,997,047 | A * | 3/1991 | Schroeder | E21B 7/00 175/162 |
| 5,242,025 | A * | 9/1993 | Neill | E21B 7/04 175/26 |
| 5,996,709 | A * | 12/1999 | Norris | E21B 7/16 175/2 |
| 8,104,568 | B2 * | 1/2012 | Luchini | G01V 1/147 181/106 |
| 9,458,670 | B2 * | 10/2016 | Russell | F41A 1/02 |
| 9,500,419 | B2 * | 11/2016 | Russell | E21B 7/00 |
| 9,988,844 | B2 * | 6/2018 | Russell | E21B 7/007 |
| 10,329,842 | B2 * | 6/2019 | Russell | E21B 7/007 |
| 2010/0180593 | A1 * | 7/2010 | Schaller | F03G 7/04 60/641.2 |
| 2010/0284250 | A1 | 11/2010 | Cornish et al. | |
| 2012/0174581 | A1 * | 7/2012 | Vaughan | F24T 10/10 60/641.2 |
| 2012/0312545 | A1 * | 12/2012 | Suryanarayana | G06F 30/20 166/369 |
| 2014/0056101 | A1 | 2/2014 | Vu et al. | |
| 2014/0133519 | A1 * | 5/2014 | Freitag | F24T 10/10 374/165 |
| 2015/0159478 | A1 | 6/2015 | Georgi et al. | |
| 2015/0300327 | A1 | 10/2015 | Sweatman et al. | |
| 2016/0356087 | A1 * | 12/2016 | Russell | E21B 11/02 |
| 2017/0130531 | A1 * | 5/2017 | Russell | E21B 7/007 |
| 2018/0017691 | A1 * | 1/2018 | Dirksen | E21B 47/024 |
| 2018/0073301 | A1 * | 3/2018 | Russell | E21B 7/007 |
| 2018/0187542 | A1 * | 7/2018 | Sayed | G01V 1/184 |

OTHER PUBLICATIONS

Wittman-Regis, Agnes, "Patent Cooperation Treaty International Preliminary Report on Patentability dated Aug. 1, 2019", Patent Cooperation Treaty Application No. PCT/US18/13833, Patent Cooperation Treaty, Aug. 1, 2019.

* cited by examiner

SYSTEM FOR ACOUSTIC NAVIGATION OF BOREHOLES

PRIORITY

This patent application claims priority to the United States provisional application for patent having the application Ser. No. 62/447,350, entitled "System for Generating Geothermal Energy", filed Jan. 17, 2017. This patent application also claims priority to the United States provisional application for patent having the application Ser. No. 62/450,529, entitled "Systems for Thermal Generation of Energy", filed Jan. 25, 2017. Application 62/447,350 and application 62/450,529 are incorporated by reference herein in their entirety.

INCORPORATION BY REFERENCE

In addition to application 62/447,350 and application 62/450,529, incorporated by reference above, the following United States patent applications are incorporated by reference for all that they contain:

U.S. provisional patent application 62/255,161, filed on Nov. 13, 2015, entitled "Down-Hole Hyperdrill".

U.S. patent application Ser. No. 13/841,236, filed on Mar. 15, 2013, now U.S. Pat. No. 9,500,419,entitled "RamAccelerator System".

U.S. patent application Ser. No. 15/292,011, filed on Oct. 12, 2016, now U.S. Pat. No. 10,180,030, entitled "Ram Accelerator System".

U.S. provisional patent application 61/992,830, filed on May 13, 2014, entitled "Ram Accelerator System with Endcap".

U.S. patent application Ser. No. 14/708,932, now U.S. Pat. No. 9,458,670, filed on May 11, 2015, entitled "Ram Accelerator System with Endcap".

U.S. patent application Ser. No. 15/246,414, filed on Aug. 24, 2016, now U.S. Pat. No. 10,344,534, entitled "Ram Accelerator System with Endcap".

U.S. provisional patent application 62/067,923, filed on Oct. 23, 2014, entitled "Ram Accelerator System with Rail Tube".

U.S. patent application Ser. No. 14/919,657, filed on Oct. 21, 2015, now U.S. Pat. No. 9,988,844, entitled "Ram Accelerator System with Rail Tube".

U.S. provisional patent application 62/150,836, filed on Apr. 21, 2015, entitled "Ram Accelerator System with Baffles".

U.S. patent application Ser. No. 15/135,452, filed on Apr. 21, 2016, not U.S. Pat. No. 10,697,242, entitled "Ram Accelerator System with Baffles".

U.S. provisional patent application 62/253,228, filed on Nov. 10, 2015, entitled "Pressurized Ram Accelerator System".

U.S. patent application Ser. No. 15/340,753, filed on Nov. 1, 2016, now U.S. Pat. No. 10,557,308, entitled"Projectile Drilling System".

U.S. provisional patent application 62/393,631, filed on Sep. 12, 2016, entitled "Augmented Drilling System Using Ram Accelerator Assembly".

U.S. patent application Ser. No. 15/698,549, filed on Sep. 7, 2017, now U.S. Pat. No. 10,590,707, entitled "Augmented Drilling System".

U.S. patent application Ser. No. 15/348,796, filed on Nov. 10, 2016, now U.S. Pat. No. 10,329,842, entitled "System for Generating a Hole Using Projectiles".

BACKGROUND

Traditional drilling and excavation methods, such as those used to form wells for producing hydrocarbons, water, or geothermal energy, utilize drill bits to form holes in the Earth's surface. Conventional drilling methods may be expensive, material-intensive, and time consuming, requiring times ranging from many minutes to many hours or days to remove geologic material and extend the depth of a hole by a linear foot, depending on the cross-sectional area and characteristics of the material being moved. Additionally, the efficient location and navigation of conventional boreholes toward geological features may be limited to the features that may be readily detected using signals from the surface or from use of devices within a drilling string.

BRIEF DESCRIPTION OF DRAWINGS

Certain implementations and embodiments will now be described more fully below with reference to the accompanying figures, in which various aspects are shown. However, various aspects may be implemented in many different forms and should not be construed as limited to the implementations set forth herein. The figures are not necessarily to scale, and the relative proportions of the indicated objects may have been modified for ease of illustration and not by way of limitation. Like numbers refer to like elements throughout.

DETAILED DESCRIPTION

Figure 1:
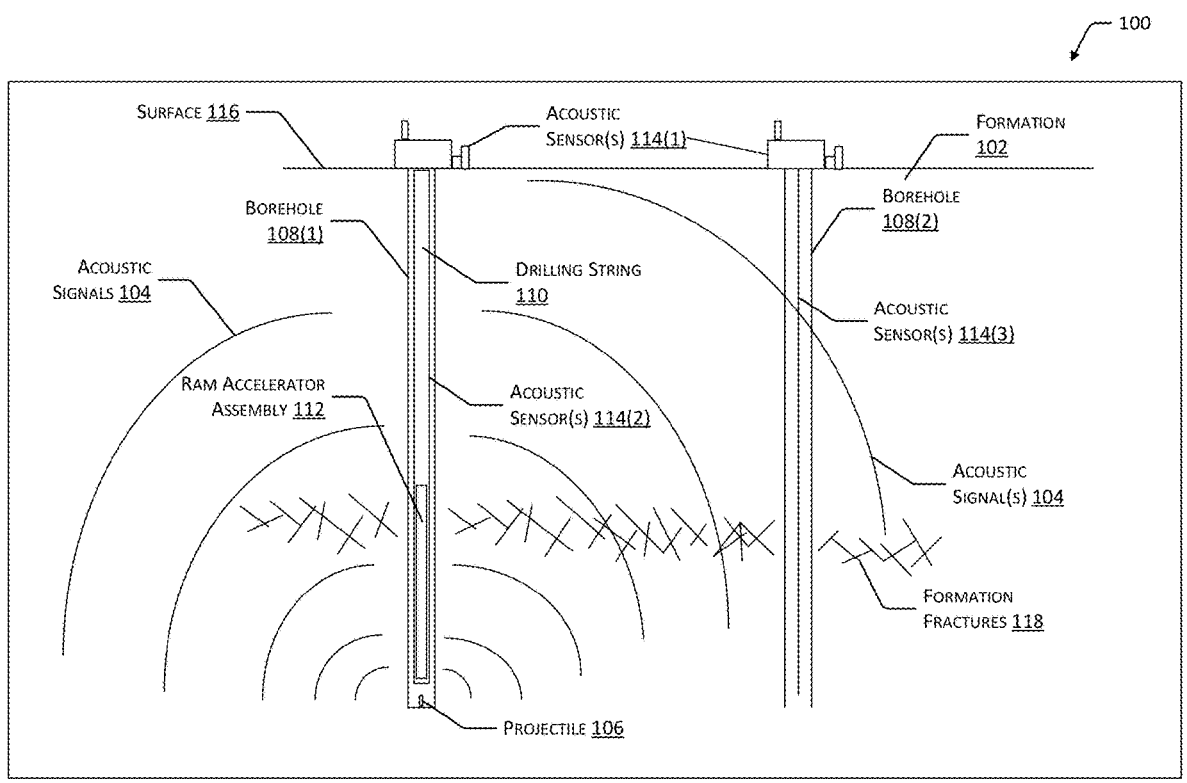
FIG. 1 depicts an implementation of a system for determining characteristics of a formation using acoustic signals generated from interactions between projectiles and geologic material.

Conventional drilling and excavation techniques used for penetrating materials typically rely on mechanical bits used to cut or grind at a working face. Tool wear and breakage associated with mechanical bits may slow these operations, increasing costs. Furthermore, the low rate of progress when cutting through a resistant material, such as hard rock, may be prohibitive due to the time or cost required. Additionally, the environmental impact of conventional drilling techniques may be significant. For example, conventional drilling techniques may require a significant supply of water, which may not be readily available in some regions. As a result, resource extraction may be prohibitively expensive, time consuming, or both. Drilling through a geological formation may be used in the establishment of water wells, oil wells, gas wells, underground pipelines, geothermal wells, and so forth.

For example, geothermal energy may be produced by drilling a borehole into the Earth's surface to a depth at which the geologic formation has a temperature significantly greater than that at the Earth's surface. The ambient temperature of rock or other geologic materials within a borehole increases proportionally based on the depth of the borehole. The heat from the geologic material may be conducted to the surface for generation of energy, such as by providing a cool fluid into the borehole, where heat from the formation is transferred to the fluid, then returning the fluid to the surface. For example, fluid may be provided into a first borehole, then circulated outward through a second borehole connected to the first borehole. As another example, fluid may be provided into a first string or annulus in a single borehole, then circulated outward through a second string or annulus. In other implementations, thermoelectric materials may be provided into a borehole formed in the Earth's surface. Thermoelectric materials may generate electrical power, such as an electric current when exposed to a temperature gradient. To create a temperature gradient, a fluid that is cooler than the surrounding geologic material may be injected into the borehole, such as within a tube, pipe, or other type of conduit, then circulated toward the surface. The fluid within the conduit, being cooler than the geologic material outside of the conduit, creates a temperature gradient that may cause thermoelectric materials associated with the conduit to generate a current. One example system for harnessing geothermal energy from abandoned oil and gas wells is described in published United States patent application 2010/0180593, filed Jan. 21, 2009, entitled "System for Closed-Loop Large Scale Geothermal Energy Harvesting", which is incorporated by reference herein in its entirety.

In many cases, the formation of a borehole that extends to a depth sufficient to generate a significant quantity of geothermal energy is non-economical. For example, the formation of a borehole may require significant time, equipment, and materials, may incur a significant cost, and may generate a significant environmental impact. Though human energy demand continues to rise, the value of geothermal energy obtainable from within a borehole may not offset the significant costs used to form the borehole. However, geothermal energy advantageously is not affected by geographic location or climate in the manner that solar, wind, hydroelectric, or other renewable energy sources may be affected. Additionally, geothermal energy is not limited in supply or responsible for significant environmental impacts commonly associated with non-renewable hydrocarbon-based energy sources such as coal, oil, and natural gas. The natural radiogenic decay inside of the Earth is generally consistent across all geographic locations and provides from 85% to 95% of the thermal heat generated, with the remainder of the planet's heat being latent heat from planetary formation and acceleration.

Described in this disclosure are systems and methods for efficiently generating boreholes for generation of geothermal energy, that may be more economical than conventional methods for harnessing geothermal energy. Implementations may include a scalable, closed-loop system in which working fluids provided into the system do not contact geologic material, and use of fracturing techniques (e.g., "fracking")

may not be required. In other implementations, artificial or natural stimulation of a geologic formation may be used to improve the recovery of geothermal energy.

In some implementations, a borehole may be formed in the Earth's surface, at least in part, by use of accelerated projectiles. For example, U.S. patent application Ser. Nos. 15/340,753 and 15/698,549, incorporated by reference previously, describe systems and methods in which the progress of a rotary drill bit may be facilitated by accelerating projectiles into geologic material in front of the drill bit. The accelerated projectiles may be moved through a drilling string or other type of conduit through use of pressurized materials, combustible materials, movement of drilling fluid or other materials, and so forth. In some implementations, the drilling conduit used to form a borehole may include coiled tubing, which reduces the above-ground drilling infrastructure required to form the borehole when compared to other techniques that utilize other types of drilling conduits. For example, a bottomhole assembly (BHA) configured to accelerate projectiles, such as the BHA described with regard to, U.S. patent application Ser. No. 15/340,753, as well as a drill bit having one or more orifices configured to permit passage of accelerated projectiles, may be secured to the end of a length of coiled tubing. Upon contact with the geologic material, the accelerated projectiles may displace at least a portion of the material and weaken at least a portion of the material to facilitate the ability of the drill bit to displace the weakened material. In some implementations, to obviate the need to provide projectiles into a string of coiled tubing, which may have a limited diameter, projectiles may be formed using a slurry or other type of fluid, such as drilling fluid, uncured concrete, barite concrete, and so forth. A container for receiving the slurry or other fluid may be positioned downhole, and once filled with material, the container may be accelerated to impact the geologic material. In some implementations, the containers for receiving materials may include a resin or other curable material that may be provided downhole as a liquid, then cured, such as through use of ultraviolet light, chemicals, or other types of energy.

In some cases, a borehole may be formed using projectiles accelerated using a ram accelerator assembly. For example, U.S. patent applications 62/253,228; Ser. Nos. 13/841,236; 15/292,011; 61/992,830; Ser. Nos. 14/708,932; 15/246,414; 62/067,923; Ser. Nos. 14/919,657; 62/150,836; and Ser. No. 15/135,452, incorporated by reference previously, describe forming holes in various materials using accelerated projectiles. In other implementations, a borehole may be formed in the Earth's surface, at least in part, by use of detonated material, which in some cases may be used to facilitate the progress of a drill bit. For example, U.S. patent application Ser. No. 15/348,796, incorporated by reference previously, describes systems and methods for generating holes using projectiles, which may in some implementations include detonatable material.

Formation of a borehole using accelerated projectiles may allow the borehole to be formed and extended to a significant depth, suitable for the generation of geothermal energy, in less time and at a lower cost than conventional drilling techniques, which may cause the production of geothermal energy within the downhole environment to become economical. In some implementations, such as described in U.S. patent application Ser. No. 15/698,549, incorporated by reference previously, the direction in which the borehole is extended may be controlled at least in part by the direction in which a projectile is accelerated relative to a longitudinal axis of a drilling string, drill bit, or BHA. The direction in which the borehole is extended may be selected at least in part based on the location of geologic features suitable for generation of geothermal energy.

For example, at least a portion of the interactions between accelerated projectiles and the geologic formation may generate detectable acoustic signals, such as vibrations that are conducted through the formation outward from the point of impact between the projectile and the formation. These acoustic signals may be detected using one or more sensors at the Earth's surface, within the drilling string, or within other boreholes proximate to the borehole that is being extended using accelerated projectiles. For example, sensors may be located within a length of fiberoptic cable positioned within a borehole. By processing the acoustic signals, characteristics of the formation through which the acoustic signals traveled may be determined. The characteristics of the formation may be used to determine a location suitable for generation of geothermal energy. For example, the acoustic signals may be analyzed to determine the hardness and porosity of geological material and the location of natural fractures within the geologic formation, at a depth having a temperature suitable for generation of geothermal energy. Acoustic signals may thereby be used to intelligently steer the direction in which a borehole is generated to optimize the rate at which the borehole is extended, such as by steering a drill bit away from hard rock or toward more porous geologic material. Additionally, acoustic signals may be used to extend a borehole in a direction that may more efficiently generate thermal energy, such as by steering a drill bit toward a region in a formation that includes natural fractures. The presence of natural fractures of at least a threshold size may increase the quantity of natural heat that may be extracted from the formation. Additionally, in some cases, the presence of natural fractures may increase the efficiency of fracturing or other stimulation operations to lengthen or widen existing fractures or increase the number of fractures that are present. Based on the locations of the natural fractures or other desirable characteristics of the geologic material, the borehole may be navigated toward selected locations, such as through use of the techniques described in U.S. patent application Ser. No. 15/698,549.

In some implementations, characteristics of a formation determined using acoustic signals may be used to determine characteristics of projectiles, drill bits, combustible materials, explosive materials, and so forth that may be used to optimize formation of a borehole and the direction in which the borehole is formed. For example, projectiles configured to accelerate material in a lateral direction, toward detected fractures, may be used when the drill bit nears a location having natural fractures, such that the interaction between the accelerated material and the formation may enhance the fractures. Enhancement of a region that includes fractures may lengthen or widen existing fractures, generate additional fractures in the formation, and so forth.

Each successive interaction between a projectile and the formation may generate additional acoustic signals that may be used to further determine characteristics of the formation as the borehole is extended. Additionally, as drilling mud or other fluids are circulated within the borehole, the temperature of the fluid circulated to the surface may be measured to determine the potential for generation of geothermal energy at the current depth of the borehole. Furthermore, in addition to using acoustic signals to steer the direction in which a borehole is extended, acoustic signals may be used to determine the location of a drill bit or other component of a drilling string. For example, based on characteristics of the acoustic signals generated by interaction between a formation and accelerated projectiles, the times at which projectiles are accelerated, the times at which acoustic signals are received by particular acoustic sensors, and so forth, the location of a drill bit or other portion of a drilling string in the Earth may be determined. Use of acoustic signals to locate a drill bit may be used in place of measurement while drilling (MWD) equipment or similar location equipment used in a BHA, reducing the complexity, expense, and weight associated with a drilling operation.

After a depth suitable for the efficient or economic generation of geothermal energy has been reached, heat from the geologic formation may be transferred toward the surface by providing a fluid having a temperature cooler than that of the formation into the borehole. Within the borehole, the formation may heat the fluid, and the heated fluid may be circulated to the surface, where the heat may be used for generation of electrical energy. In some cases, fluid may be circulated into one or more boreholes, and out from one or more different boreholes. For example, multiple boreholes may be connected using lateral drilling techniques, or through use of existing natural fractures in the formation. In other cases, fluid may be circulated into and from the same borehole. For example, a borehole may include an inner conduit, such as a length of coiled tubing, another type of drilling conduit, or a separate conduit that may be provided into the borehole after removal of the coiled tubing drilling conduit. The borehole may also include an outer conduit, such as casing, that provides a barrier between the geologic material and the borehole, to define an annulus. A fluid having a temperature cooler than that of the geologic material may be provided into the inner conduit. The fluid may exit the inner conduit at a lower end thereof, or through one or more other openings formed in the inner conduit, to enter the annulus and flow toward the surface. In other implementations, fluid may be flowed into the annulus and retrieved through the inner conduit. In still other implementations, a borehole may include multiple conduits within, one or more of which may be used to flow fluid into the borehole and one or more of which may be used to flow fluid toward the surface.

In some implementations, a borehole may be formed using an outer conduit, while an inner conduit having a smaller diameter than the outer conduit may be inserted into the outer conduit and secured to the counter conduit, such as through use of extrusion, welding, or one or more plugs. The inner conduit may then be used to provide cement or other completion materials into the borehole to enable completion of the borehole (e.g., with a cement liner) to be performed concurrently with or in close temporal proximity to formation of the borehole.

In some implementations, electrical power, such as an electrical current may be generated within the borehole for transmission to the surface. For example, thermoelectric materials, such as thermophotovoltaic (TPV) energy conversion elements, may be positioned along at least a portion of the exterior of the inner conduit, at least a portion of the interior of the outer conduit, or on both the inner and outer conduits. Placement of thermoelectric materials within the annulus between the inner and outer conduits, such as along the interior of the outer conduit proximate to the geologic material, may facilitate generation of a thermal gradient across the thermoelectric materials. For example, the geologic material, which may have an elevated temperature compared to that of the Earth's surface, based on the depth of the borehole, may be adjacent to a first side of the thermoelectric materials, while the interior of the borehole is positioned on a second side of the thermoelectric materials.

Thus, the fluid may be adjacent to and flow past the second side of the thermoelectric materials, creating a thermal gradient in combination with the warmer geologic material positioned adjacent to the first side of the thermoelectric materials. In some cases, a coiled tubing unit may provide a dual-use of the tubing for the inner pipe (cold water) well completion. In some implementations, the BHA may have thermoelectric elements, electrical connections, and fluid connections attached at the time of use, enabling drilling and completion of a well to be finished in a single step. For example, a single hole may be drilled to enable completion of a well without requiring repetitive trips for completion processes. In some implementations, characteristics of the formation that are determined through use of acoustic signals, may be used to determine, in real time, a quantity, placement, and type of thermoelectric elements within a drilling conduit or at the surface that may optimize the generation of thermal energy using the borehole.

In some implementations, an outer annulus may exist between the geologic material and the exterior of the outer conduit within a borehole. For example, U.S. provisional patent application 62/393,631 and U.S. patent application Ser. No. 15/698,549, incorporated by reference previously, describe methods by which a drill bit may be steered and the shape of a borehole may be controlled by accelerating projectiles in a direction non-parallel relative to the longitudinal axis of the drill bit. The selective acceleration of projectiles in particular directions may be used to provide boreholes with regions of varying diameter, such as a region having a diameter greater than that of the casing. Additionally, the directional use of projectiles may enable boreholes to be provided with regions having unique cross-sectional shapes, such as hexagonal shapes. In cases where an outer annulus is formed between the outer conduit and the geologic material, a fluid or other material within the outer annulus may be warmer than the fluid provided into the inner conduit. In some implementations, a plug, valve, seal, or other type of closure element may be positioned in the outer annulus to prevent the circulation of warm fluid or other materials from the downhole environment toward the surface via the outer annulus. Placement of the closure element or use of one or more downhole apparatuses, such as a pump or turbine, may enable the fluid or other material within the outer annulus to be circulated, to distribute and maintain heat proximate to the exterior of the outer conduit. Circulation of fluid in the outer annulus may also transfer heat from a lower portion of a borehole toward an upper portion.

Implementations described herein may also include a method for forming a borehole for generating geothermal energy based on user input. For example, a user accessing an application or other type of user interface may indicate a geologic location, a desired price or cost for energy (e.g., expressed in units of currency per units of energy, such as dollars per kilowatt hour), a desired date or range of dates over which the energy is desired, and so forth. Additional information, such as interest rates, discounts due to the time value and cost of currency, and so forth may also be input, or derived based on geologic, economic, political, or other factors. Based on the input and derived information, a graph or other output associating temperature versus depth for the geologic location may be determined. Based on the requested quantity or price of power, a quantity of available energy storage, the load serviced by the energy, and so forth, the overall power requirements of a system for producing geothermal energy may be determined, such as the depth, temperature, quantity of thermoelectric material, placement of the thermoelectric material, and so forth. Formation characteristics determined through analysis of the acoustic signals and the temperature of materials circulated from within the borehole may be used to determine the capacity of the borehole for generation of geothermal energy. In some cases, the economic characteristics of generating geothermal energy using a borehole may be determined and updated as the borehole is extended.

FIG. 1 depicts an implementation of a system 100 for determining characteristics of a formation 102 using acoustic signals 104 generated from interactions between projectiles 106 and geologic material. As described previously and in greater detail with regard to FIGS. 2-4, one or more boreholes 108 may be formed in the formation 102 at least in part by accelerating projectiles 106 through a portion of a drilling string 110 into contact with the formation 102. For example, interaction between a projectile 106 and a portion of the formation 102 proximate to a drill bit may weaken the formation 102 proximate to the drill bit and facilitate advancement of the drill bit through the formation 102. As each projectile 106 impacts the formation 102 proximate to the drill bit, the interaction between the projectile 106 and the impacted location of the formation 102 may generate one or more acoustic signals 104. For example, the acoustic signals 104 may include the vibration of rock, soil, or other geologic material within the formation 102. In some implementations, the projectile(s) 106 may be accelerated using a ram accelerator assembly 112, which may be positioned in the drilling string 110 at or near a lower end thereof, at or near an upper end thereof, or at another point along the length of the drilling string. Example systems and methods for accelerating projectiles 106 using ram accelerator assemblies 112 are described with regard to U.S. patent application Ser. Nos. 13/841,236; 15/292,011; 14/708,932; 15/246,414; 14/919,657; 15/135,452; and Ser. No. 15/698,549, incorporated by reference previously.

The acoustic signals 104 generated by the interaction between the projectiles 106 and the formation 102 may be detected using one or more acoustic sensors 114. Acoustic sensors 114 may include, for example, geophones, accelerometers, a distributed acoustic sensing (DAS) system that uses optical fibers to detect signals, and so forth. For example, a DAS system may propagate an optical pulse signal along a fiber optic cable and measure strain experienced by the cable due to acoustic signals 104 based on the manner in which interaction with the acoustic signals 104 affects the optical pulse signal. Acoustic sensors 114 may be positioned at a variety of locations to detect the acoustic signals 104. For example, FIG. 1 depicts a first set of acoustic sensors 114(1) positioned at the Earth's surface 116, such as within one or more facilities configured to provide materials into or receive materials from the boreholes 108. Continuing the example, a facility at the surface 116 may be used to provide a cool fluid into a borehole 108 to be heated by the formation 102, then receive the warmed fluid from within the borehole 108 for generation of geothermal energy. As another example, a facility at the surface 116 may provide drilling fluids into a borehole 108 to facilitate operation of a drill bit, measure the temperature of drilling fluid or debris that flows out from the borehole 108, raise and lower a drilling string 110, and so forth. Acoustic sensors 114(1) may also be positioned outside of facilities, buried within geologic material at or near the surface 116, at locations above the surface 116, within bodies of water at the surface 116, and so forth. FIG. 1 depicts a second set of acoustic sensors 114(2) positioned along the drilling string 110 within a first borehole 108(1). For example, one or more conduits or other elements within the drilling string 110 may house one or more acoustic sensors 114(2). In some implementations, the acoustic sensors 114(2) may be included in a fiber optic cable or similar flexible elongated member. In other implementations, one or more acoustic sensors 114(2) may be associated with a BHA used to accelerate projectiles 106 into contact with geologic material, such as proximate to the upper or lower end of the BHA. In still other implementations, acoustic sensors 114(3) may be within one or more other boreholes 108 proximate to the first borehole 108(1). For example, FIG. 1 depicts a third set of acoustic sensors 114(3) within a second borehole 108(2) proximate to the first borehole 108(1). Continuing the example, a length of fiber optic cable or a similar element associated with one or more acoustic sensors 114(3) may be lowered within the borehole 108(2) where acoustic signals 104 associated with another borehole 108(1) may be detected.

The detected acoustic signals 104 may be analyzed, such as at one or more facilities at the surface 116 of the borehole(s) 108, to determine the location of a drill bit or other portion of the drilling string 110. For example, based on the time at which a projectile 104 is accelerated into contact with the formation 102, the locations of various acoustic sensors 114, and the times at which the acoustic signals 104 are received by the acoustic sensors 114, the location of the terminal end of the drilling string 110 within the formation 102 may be determined. As a result, a drill bit or other components of the drilling string 110 may be located, and the extension of the borehole 108 may be steered, without requiring use of MWD equipment or other devices for locating the drill bit or drilling string 110. By avoiding the use of MWD equipment or other devices for locating the drill bit or drilling string 110, the cost associated with forming the borehole 108 may be decreased, reliability may be improved, and so forth.

Additionally, the acoustic signals 104 may be analyzed to determine characteristics of the formation 102 at various depths and locations. For example, the characteristics of the vibrations that pass through a region of the formation 102 between a first location where the projectile 106 contacted the formation 102 and a second location where an acoustic sensor 114 is located may indicate a hardness or porosity of the geologic material within the region. Continuing the example, the acoustic signals 104 may be used to determine the presence of hard rock or softer geologic materials, which may in turn be used to steer the drilling string 110 in a direction conducive to more rapid elongation of the borehole 108(1), such as by steering the drilling string 110 toward more porous or softer materials or away from harder or less porous materials. Other characteristics of the formation 102 that may be detected using the acoustic signals 104 may include a density of a region of the formation 102, the presence of water (e.g., aquifers), salt (e.g., salt domes), natural formation fractures 118 ("fractures"), and so forth. Locations within the formation 102 that include fractures 118 may be more conducive for generation of heat and as such, fluid may be provided within the borehole(s) 108 proximate to the fractures 118. In some cases, specialized projectiles 106 may be used to impact or enlarge the fractures 118 to increase the heat that may be accessed within the borehole 108(1). In other cases, the fractures 118 may be used as a lateral conduit between multiple boreholes 108. In still other cases, the fractures 118 may indicate a weakened area of the formation 102 through which a drill bit may be readily navigated, such as by steering the drill bit in a lateral direction. For example, boring through a region of the formation 102 that includes fractures 118 may facilitate formation of a connection between multiple boreholes 108.

In such a case, a fluid provided into a first borehole 108 may be circulated and retrieved via the second borehole 108. In some implementations, the direction in which the borehole 108(1) is elongated may be controlled by controlling the direction in which projectiles 106 are accelerated out from the drilling string 110 relative to the longitudinal axis thereof, as described in U.S. patent application Ser. No. 15/698,549, incorporated by reference previously.

Figure 2:
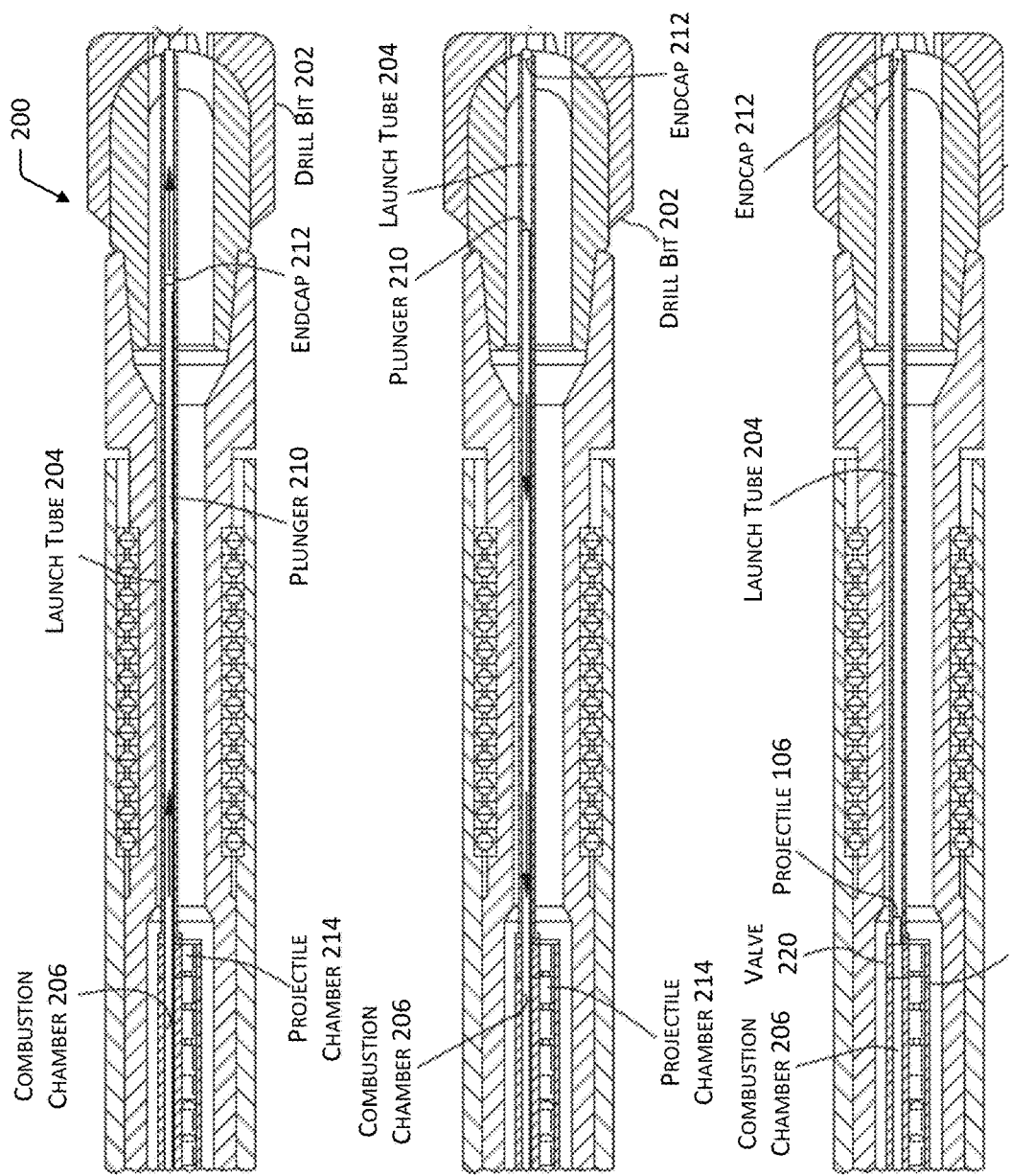
FIG. 2 illustrates a first portion of a method for forming a borehole within geologic material by accelerating projectiles to interact with the formation ahead of a drill bit.

FIG. 2 illustrates a first portion 200 of a method for forming a borehole 108 within geologic material by accelerating projectiles 106 to interact with the formation 102 ahead of a drill bit 202. As described, for example, in U.S. patent application Ser. No. 15/698,549, incorporated by reference previously, a launch tube 204 may be used to guide accelerated projectiles 106 through an orifice in the drill bit 202 and into the geologic formation 102. An upstream end of the launch tube 204 may terminate at a combustion chamber 206 within the BHA, while the downstream end of the launch tube 204 terminates at the orifice in the drill bit 202. In use, pressure generated using a propellant within the combustion chamber 206 may accelerate a projectile 106 positioned within the launch tube 204 in a downstream direction toward the drill bit 202, where the projectile 106 may exit the orifice to impact the geological formation in front of the drill bit 202. Subsequent operation of the drill bit 202 may cause the drill bit 202 to penetrate through the portion of the formation 102 that is weakened by the interaction with the projectile 106.

At block 208, a plunger 210, which may be housed in a tube, conduit, or other type of housing located upstream from the launch tube 204, may be extended in a downstream direction toward the drill bit 202. The plunger 210 may carry a projectile 106 and an endcap 212 that were positioned in the combustion chamber 206 or launch tube 204 at a downstream end thereof, toward the drill bit 202. For example, a projectile 106 and endcap 212 within a projectile chamber 214 adjacent to the combustion chamber 206 may pass into the combustion chamber 206 or launch tube 204 prior to extension of the plunger 210 toward the drill bit 202. As the plunger 210, projectile 106, and endcap 212 are advanced in a downstream direction, this motion may push drilling fluid, formation fluid, debris, or other types of ejecta out of the launch tube 204, such as by urging the ejecta through the orifice or another opening in the drill bit 202 or launch tube 204.

At block 216, the plunger 210 may seat the endcap 212 at or near the downstream end of the launch tube 204. The endcap 212 may seal the launch tube 204, preventing entry of drilling fluid, formation fluid, debris, or other ejecta from the borehole 108. Additionally, placement of the endcap 212 may enable the launch tube 204 to be evacuated to facilitate acceleration of the projectile 106 toward the drill bit 202. For example, as the plunger 210 and projectile 106 are withdrawn in the upstream direction, this motion may evacuate the launch tube 204. In some implementations, at least a portion of the launch tube 204 may be evacuated to a pressure of 25 torr or less.

At block 218, the plunger 210 may withdraw from the launch tube 204, seating the projectile 106 at the upstream end of the launch tube 204. In some implementations, a valve 220 or other type of closure mechanism located between the launch tube 204 and combustion chamber 206 may close as the plunger 210 is withdrawn, such that the projectile 106 is seated past the valve 220 at the upstream end of the launch tube 204, proximate to the combustion chamber 206.

Figure 3:
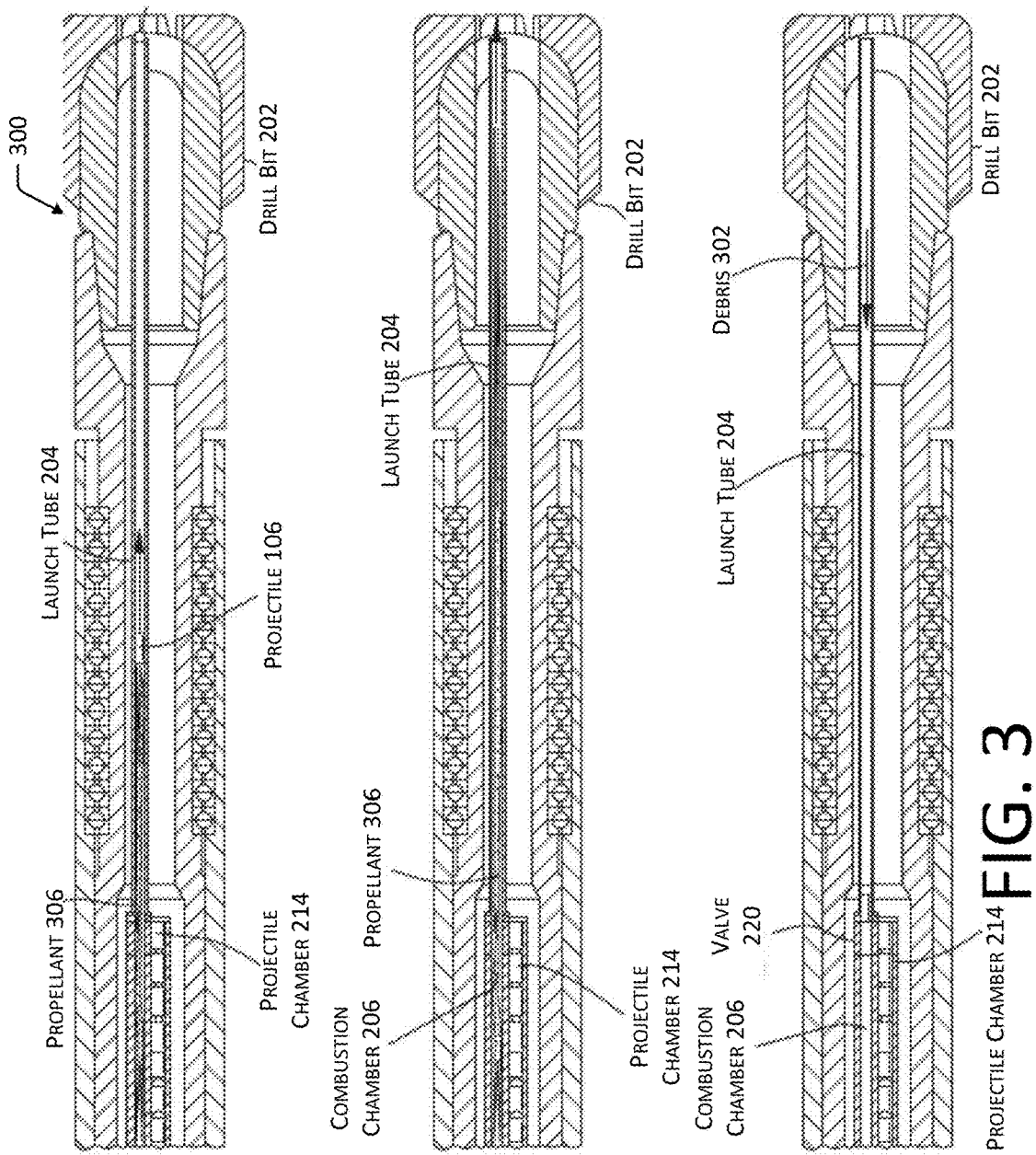
FIG. 3 illustrates a second portion of a method for forming a borehole within geologic material by accelerating projectiles to interact with the formation ahead of a drill bit.

FIG. 3 depicts a second portion 300 of a method for forming a borehole 108 within geologic material by accelerating projectiles 106 to interact with the formation 102 ahead of a drill bit 202. As described with regard to FIG. 2, a plunger 210 or similar mechanism may be used to place an endcap 212 at or near the downstream end of a launch tube 204 to seal the launch tube 204 and prevent the entry of debris 302. Downstream movement of the plunger 210 and endcap 212 may push or wipe debris 302, such as formation materials, drilling fluid, ejecta, and so forth from the launch tube 204, while upstream movement of the plunger 210 and projectile 106, after placing the endcap 212, may evacuate the launch tube 204. The projectile 106 may be placed at or near the upstream end of the launch tube 204, such as proximate to a combustion chamber 206, on the opposite side of a valve 220 that separates the combustion chamber 206 from the launch tube 204.

At block 304, the combustion chamber 206 may be at least partially filled with propellant 306. Propellant 306 may include any manner of combustible material, pressurized material, or other types of reactants or sources of motive force that may be imparted to the projectile 106. For example, the propellant 306 may include one or more combustible gasses, which may be ignited. In some implementations, compression of the propellant 306 via upstream movement of the projectile 106 or plunger 210 may ignite or pressurize the propellant 306. In other implementations, other types of ignition may be used, such as a separate ignition mechanism. Pressure from the combustion reaction, or other type of reaction, associated with the propellant 306 may accelerate the projectile 106 through the launch tube 204 and toward the drill bit 202. In cases where a valve 220 or other closure mechanism separates the combustion chamber 206 from the launch tube 204, pressure from the propellant 306 may cause the valve 220 to open or otherwise permit passage of pressure from the propellant 306 into the launch tube 204. In some implementations, evacuation of the launch tube 204 caused by the upstream movement of the plunger 210 and projectile 106, described with regard to FIG. 2, may further increase the pressure differential between the launch tube 204 and combustion chamber 206, which may facilitate acceleration of the projectile 106 through the launch tube 204.

At block 308, the projectile 106 may penetrate through the endcap 212 and exit the launch tube 204 at the face of the drill bit 202, such as by passing through an orifice in the drill bit 202. The accelerated projectile 106 may then impact the geological formation 102 ahead of the drill bit 202. Interactions between the projectile 106 and the formation 102 may weaken the formation 102, enabling the drill bit 202 to penetrate through the weakened formation 102 more efficiently than the drill bit 202 would penetrate through the formation 102 in the absence of interaction between the formation 102 and the projectile 106. Interactions between the projectile 106 and the formation 102 may destroy at least a portion of the projectile 106 and the formation 102, and in some implementations, destroy at least a portion of the endcap 212. In other implementations, a shutter, valve, diaphragm, or other closure mechanism, may instead be used in place of the endcap 212, and passage of the projectile 106 may open the closure mechanism. The debris 302 created by these interactions may be carried toward the surface 116, such as by the flow of drilling fluid in an upstream direction. In some implementations, byproducts, waste, or debris 302 generated by combustion or discharge of the propellant 306 may also exit the launch tube 204. For example, byproducts of the propellant 306 combustion may exit the orifice in the drill bit 202. In other implementations, one or more vents or other openings in the launch tube 204, drill bit 202, or combustion chamber 206 may be used to permit byproducts to flow into the annulus. In some cases, byproducts of the propellant 306 that exit the orifice in the drill bit 202 or another portion of the drilling string 110 may facilitate transport of debris 302 in an upstream direction.

At block 310, after the projectile 106 has exited the launch tube 204, the valve 220 at the upstream end of the launch tube 204 may close, and another projectile 106 and endcap 212 may be positioned in the launch tube 204 or combustion chamber 206 to enable the process described with regard to FIGS. 2 and 3 to be repeated. For example, a projectile 106 and endcap 212 from the projectile chamber 214 may pass into the combustion chamber 206 due to a pressure differential between the projectile chamber 214 and combustion chamber 206, subsequent to acceleration of the previous projectile 106. As the drill bit 202 progresses through the formation 102, the launch tube 204 may fill with drilling fluid, ejecta, or other debris 302. For example, debris 302 may enter the orifice in the drill bit 202 subsequent to destruction of the endcap 212 by the accelerated projectile 106. The debris 302 that enters the launch tube 204 may be cleared by motion of the plunger 210 to seat the subsequent endcap 212, as described with regard to FIG. 2.

Figure 4:
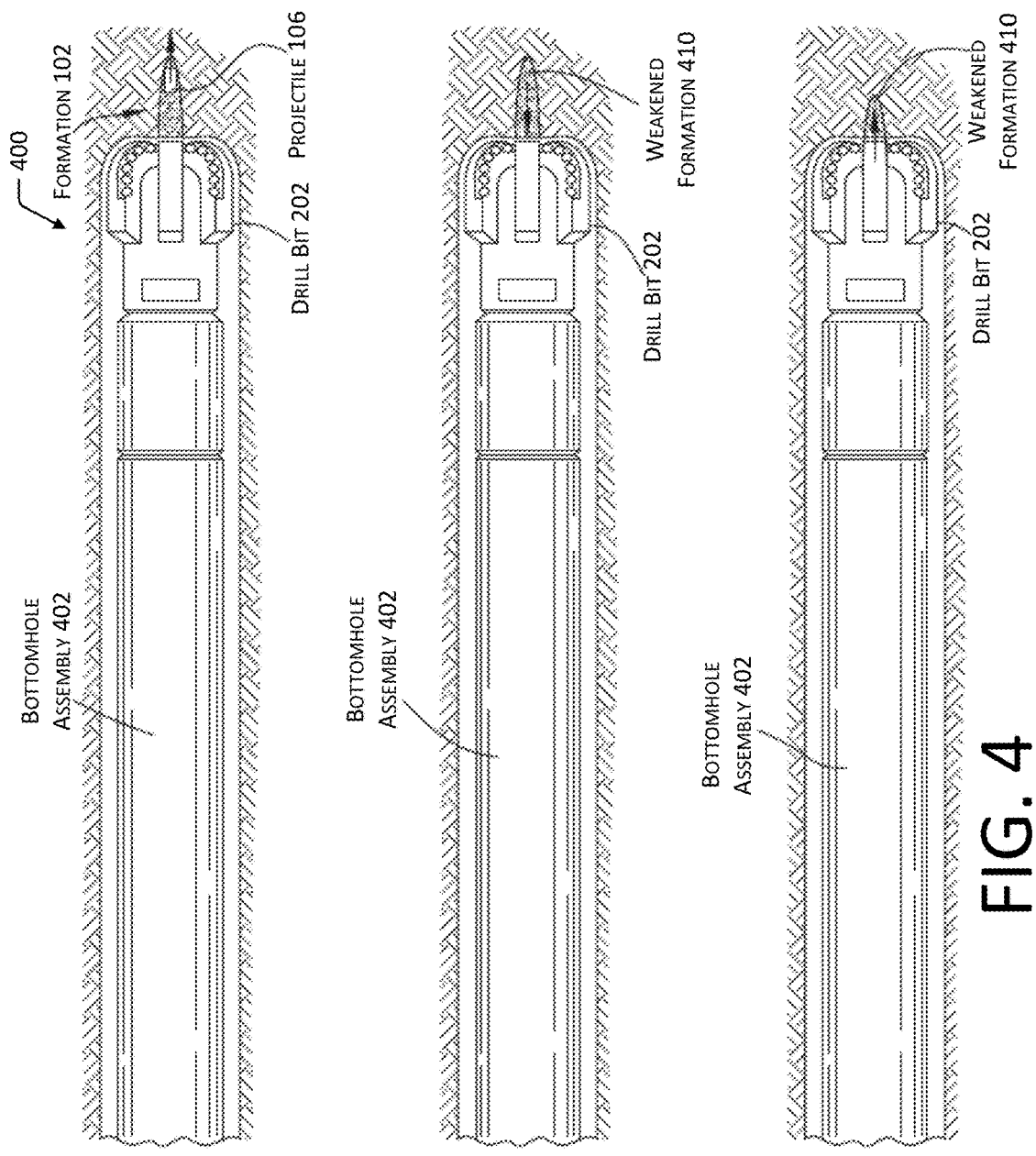
FIG. 4 illustrates a third portion of a method for forming a borehole within geologic material by accelerating projectiles to interact with the formation ahead of a drill bit.

FIG. 4 depicts a third portion 400 of a method for forming a borehole 108 within geologic material by accelerating projectiles 106 to interact with the formation 102 ahead of a drill bit 202. As described with regard to FIGS. 2 and 3, a launch tube 204, combustion chamber 206, one or more propellant 306 materials, a plunger 210, and a projectile chamber 214 containing one or more projectiles 106 and endcaps 212 may be contained within a bottomhole assembly 402 of a drilling string 110. Acceleration of a projectile 106 toward the formation 102 may cause the projectile 106 to interact with at least a portion of the formation 102 proximate to the drill bit 202, which may facilitate penetration of the drill bit 202 through the formation 102 when compared to penetration of the drill bit 202 in the absence of the interaction between the projectile 106 and the formation 102.

At block 404, an accelerated projectile 106 may exit an orifice in the drill bit 202, impact the geological formation 102, and penetrate at least a short distance into the formation 102. For example, a projectile 106 may be accelerated to a hypervelocity and may interact with the formation 102 as a fluid-fluid interaction upon impact, forming a hole having a generally cylindrical shape. As another example, a projectile 106 accelerated to non-hypervelocity speed may interact with the formation 102 as a solid-solid interaction, which may fracture or fragment a portion of the formation 102, forming a hole that may be cylindrical, a crater having a conical profile, or another shape. Independent of the velocity of the projectile 106, interactions between the accelerated projectile 106 and the formation 102 may displace, compress, remove, fracture, or otherwise weaken the geologic material of the formation 102 at or near the point at which the projectile 106 impacts the formation 102.

At block 406, interactions between the projectile 106 and the formation 102 may pulverize or otherwise degrade at least a portion of the projectile 106 and weaken at least a portion of the formation 102 in front of the drill bit 202. The resulting debris 302 may flow upstream, such as via the annulus. In some implementations, the debris 302 may include portions of an endcap 212 penetrated by the projectile 106, propellant 306 used to accelerate the projectile 106, byproducts from the combustion or reaction of propellant 306, and so forth. In some cases, debris 302 may flow into the drill bit 202 or launch tube 204, such as through an orifice in the drill bit 202. However, the debris 302 may subsequently be removed from the launch tube 204 when a subsequent endcap 212 is placed at or near the drill bit 202, such as by movement of a plunger 210 carrying the endcap 212, as described with regard to FIG. 2.

At block 408, the drill bit 202 may advance through the weakened formation 410 formed by interactions with the projectile 106. For example, the weakened formation 410 may include a conical crater formed via the impact between the projectile 106 and the formation 102. Continuing the example, interactions between the formation 102 and projectile 106 may pulverize the projectile 106 and the portion of the formation 102 that occupied the crater. The pulverized debris 302 may flow upstream from the crater, while rotation and lowering of the drill bit 202 may cause the drill bit 202 to penetrate the weakened formation 410. At or near the time that the drill bit 202 passes the weakened formation 410, a subsequent projectile 106 may be accelerated into the formation 102 to weaken a subsequent portion of the formation 102, further facilitating progress of the drill bit 202.

Figure 5:
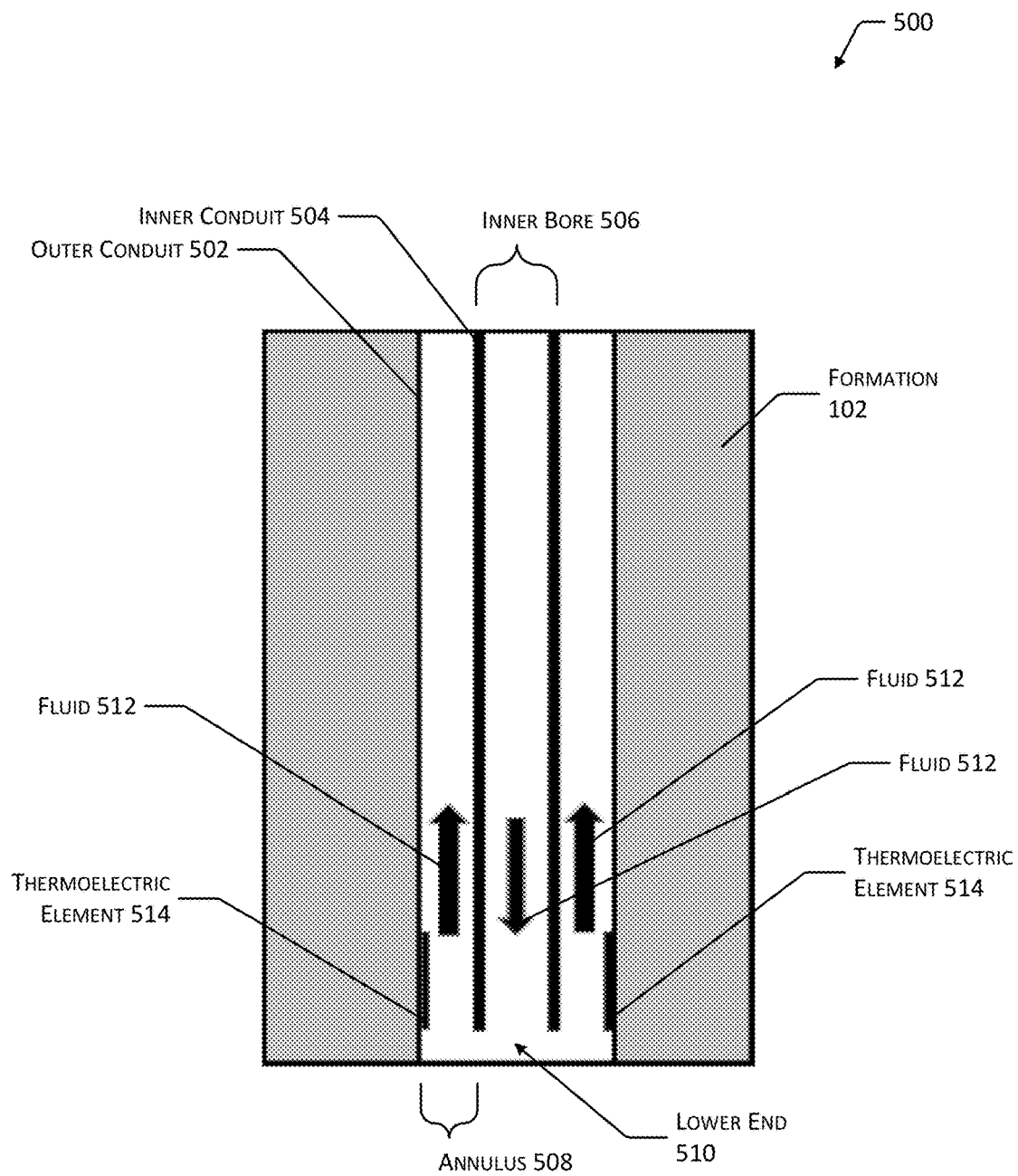
FIG. 5 depicts an implementation of a system for generating geothermal energy using a borehole.

FIG. 5 depicts an implementation of a system 500 for generating geothermal energy using a borehole 108. As discussed previously, a borehole 108 may be formed within geologic material of a formation 102, such as the surface 116 of the Earth or another planetary body. The geologic material may include rock, soil, sand, ice, and so forth. The temperature of the geologic material may increase based on the depth of the borehole 108. For example, on Earth, below a depth of 300 feet, the temperature of the geologic material surrounding a borehole 108 typically increases by one degree Celsius for every 30 meters of depth. A typical body of rock may have a density of about 2700 kilograms per cubic meter and a nominal temperature gradient ranging from 20 degrees Celsius to 30 degrees Celsius per kilometer. In some implementations, the thermal gradient within the geologic material may be tested during the drilling process. For example, during drilling of the borehole 108, the temperature of debris 302 or other fluids circulated out from the borehole 108 may be measured. In some implementations, a fluid having a temperature less than that of the geologic material may be flowed through the drilling string 110, and the temperature at one or more locations within the borehole 108 may be measured over time based on the temperature of the fluid. Based on such measurements, the resilience of the temperature of the geologic material (e.g., the thermal flux and thermal coefficients) may be determined. The measurements may be used to determine the target depth of the borehole 108 and the placement of materials within the borehole 108. In some implementations, characteristics of the geologic material determined based on analysis of acoustic signals 104 may be used to determine a target depth of the borehole 108 and a type or quantity of materials to be placed in the borehole 108. For example, based on the porosity of geologic material or the presence of natural fractures 118, thermal characteristics of the geologic material may be determined.

The borehole 108 may include one or more conduits therein. For example, an outer conduit 502 may separate the geologic material from the interior of the borehole 108. An inner conduit 504 may be positioned within the outer conduit 502. While in some implementations, the inner conduit 504 and outer conduit 502 may include concentrically-placed cylindrical conduits, in other implementations, the inner conduit 504 and outer conduit 502 may include any cross-sectional shape, and the inner conduit 502 may be placed at any position within the interior of the outer conduit 504. In still other implementations, the inner conduit 502 and outer conduit 504 may instead include multiple conduits that are not placed within one another. In some implementations, the inner conduit 502 may include a drilling conduit, such as coiled tubing or drill pipe, used to form the borehole 108. In other implementations, the outer conduit 502 may include a conduit used to form the borehole 108. For example, a borehole 108 may be drilled, such as using the methods described with regard to FIGS. 1-4, using a conduit having a generally constant diameter selected as a target or optimal diameter of the borehole 108. In still other implementations the inner conduit 504 may be positioned within the borehole 108 after forming the borehole 108 using the outer conduit 502 or another drilling conduit. In some implementations, the outer conduit 502 may include casing, cement, a liner, or another type of barrier that may be positioned in the borehole 108 during or shortly after the formation thereof, e.g., to prevent ingress of geologic material into the borehole 108. In still other implementations, the outer conduit 502 may be omitted. For example, certain types of geologic material may have a density, porosity, hardness, or other material characteristics that obviate the desirability of a barrier between the geologic material and the borehole 108.

As shown in FIG. 5, placement of the inner conduit 504 and outer conduit 502 within the borehole 108 may subdivide the borehole 108 into an inner bore 506 within the inner conduit 504 and an annulus 508 located external of the inner bore 506. In some implementations, the inner bore 506 may be in fluid communication with the annulus 508 via an open lower end 510 of the inner conduit 504. In other implementations, the inner conduit 504 may include one or more openings (not shown) formed in a sidewall thereof, through which fluid may pass into or from the annulus 508.

To generate geothermal energy using the borehole 108, a fluid 512 having a temperature cooler than that of the formation 102 at a target depth within the borehole 108 may be provided into the borehole 108, such as via the inner bore 506. While within the borehole 108, the formation 102 may transfer heat to the fluid 512, which may then be circulated in an upstream direction, such as via the annulus 508, to the surface 116. In some implementations, characteristics determined based on acoustic signals 104 may be used to determine characteristics of the formation 102. For example, changes in an acoustic signal 104 as it travels through a region of the formation 102 may indicate the hardness, porosity, density, or other material characteristics of the formation 102, such as the presence of fractures 118, rock, salt, water, and so forth. The characteristics of the formation 102 may indicate the capacity of the formation 102 to retain and transfer heat. These characteristics may be used to determine a type of fluid 512 to be provided into the borehole 108 and the rate at which the fluid 512 is delivered. For example, the fluid 512 may include brine, a metallic fluid, ammonia, water, salt water, molten salt, or other types of fluid, each of which may receive heat from the formation 102, retain heat, and dissipate heat at different rates based on the characteristics of the fluid. Based on the depth of the borehole 108 and the characteristics of the formation 102, a fluid 512 may be selected to optimize heat received from the formation 102 and minimize dissipation of heat as the fluid 512 flows toward the surface 116. At the surface 116, one or more turbines or other types of devices may be used to convert the heat from the heated fluid 512 to electrical power (e.g., electrical current). In some cases, the type and quantity of equipment used to generate power using the heated fluid 512 may be determined in part based on the characteristics of the formation 102 determined using acoustic signals 104. In other implementations, fluid 512 may be provided into the borehole 108 via the annulus 508 and circulated in an uphole direction via the inner bore 506. In still other implementations, fluid 512 may be provided into a first borehole 108 via one or more conduits, circulated to a second borehole 108, such as via one or more lateral bores or existing formation fractures 118, then in an uphole direction via the second borehole 108. In yet other implementations, fluid 512 may be provided into any number of conduits or boreholes 108 and circulated upward using any number of other conduits or boreholes 108.

In some implementations, electrical current may be generated within the borehole 108 itself. For example, one or more thermoelectric elements 514 may be placed within the borehole 108 to generate current based on a thermal gradient between the geologic material and the fluid 512 within the borehole 108, or between fluid 512 that has been heated within the borehole 108 and fluid 512 that has not yet been heated. Continuing the example, one or more thermoelectric elements 514 may be positioned along the interior surface of the outer conduit 502, within the annulus 508. FIG. 5 depicts thermoelectric elements 514 positioned along the outer conduit 502 near the lower end 510 of the inner conduit 504, however, thermoelectric elements 514 may be placed at any location along the length of the outer conduit 502. In other implementations, thermoelectric elements 514 may be placed along the exterior surface of the outer conduit 502 (e.g., immediately adjacent to or contacting the geologic material), along the exterior surface of the inner conduit 504 (e.g., within the annulus 508), or along the interior surface of the inner conduit 504 (e.g., within the inner bore 506). In still other implementations, if an outer conduit 502 is not used, thermoelectric elements 514 may be positioned at selected locations within the borehole 108 along the geologic material itself. The types of thermoelectric elements 514 that are used, and the quantity and placement of the thermoelectric elements 512, may be determined at least in part based on characteristics of the formation 102, such as a density, porosity, thermal flux, and so forth, which may be determined based on analysis of the acoustic signals 104 that propagate through the formation 102. In some cases, a conduit carrying a selected type and quantity of thermoelectric elements 514 may be inserted into a borehole 108, in real time, based on characteristics of the formation 102 determined by analyzing the acoustic signals 104. For example, an inner conduit 504 having one hundred TPV elements secured to an outer surface thereof may be lowered into a borehole 108 based on a determined temperature differential between the interior of the borehole 108 and the surrounding formation 102.

The thermoelectric elements 514 may include any manner of thermoelectric generating material, thermocouple, or thermo-ionic devices. For example, thermoelectric elements 514 may include a doped silicon-based semiconductor (E.g., Tellurium-Gallium, Si) that uses Peltier or Seebeck processes to convert a temperature differential into electrical potential to generate power. In other implementations, the thermoelectric elements 514 may include TPV elements, which may generate photons responsive to the temperature of the geologic material. For example, a TPV element may include an emitter configured to generate photons responsive to a particular temperature or temperature differential and a receiver that captures at least a portion of the photons. The frequency of the generated photons may be affected by the particular temperature, and in some cases, the frequency of photons captured by the receiver may be attuned based on the expected temperature within a borehole 108. Electrons associated with photons may be collected by photoelectric cells to generate an electrical current. In some implementations, the thermoelectric elements 514 may include square or rectangular sections of thermoelectric materials, such as a rectangular material having a length and width ranging from 30-50 millimeters and a thickness of 10 millimeters or less. In other implementations, thermoelectric elements 514 may be provided with other shapes integral to the structure of the conduits to which they are engaged. For example, thermoelectric elements 514 may be formed into cylindrical or hexagonal tubes.

The thermoelectric elements 514 may generate an electrical current responsive to the temperature differential between the geologic material and the interior of the borehole 108. For example, when fluid 512 having a temperature less than that of the geologic material passes a thermoelectrical element 514, a temperature differential across the thermoelectric element 514 may be created. Continuing the example, a cooling fluid 512, such as brine, a metallic fluid, ammonia, water, salt water, molten salt, and so forth, may be provided from the surface 116 (e.g., via a pump), then circulated toward the surface 116 for capture or recirculation. In some implementations, the system 500 may include a closed-loop system in which the borehole 108 is not in fluid communication with the geologic material, such that the fluid 512 does not contact the geologic material, and the geologic material does not enter the borehole 108.

Electrically conductive materials within one or more of the inner conduit 504, the outer conduit 502, the thermoelectric elements 514, or the fluid 512 may be used to conduct the generated current toward the surface 116. In some implementations, the thermoelectric elements 514 or one or more other portions of the system 500 may include power converters, power conditioners, or other elements that modify the current.

Figure 6:
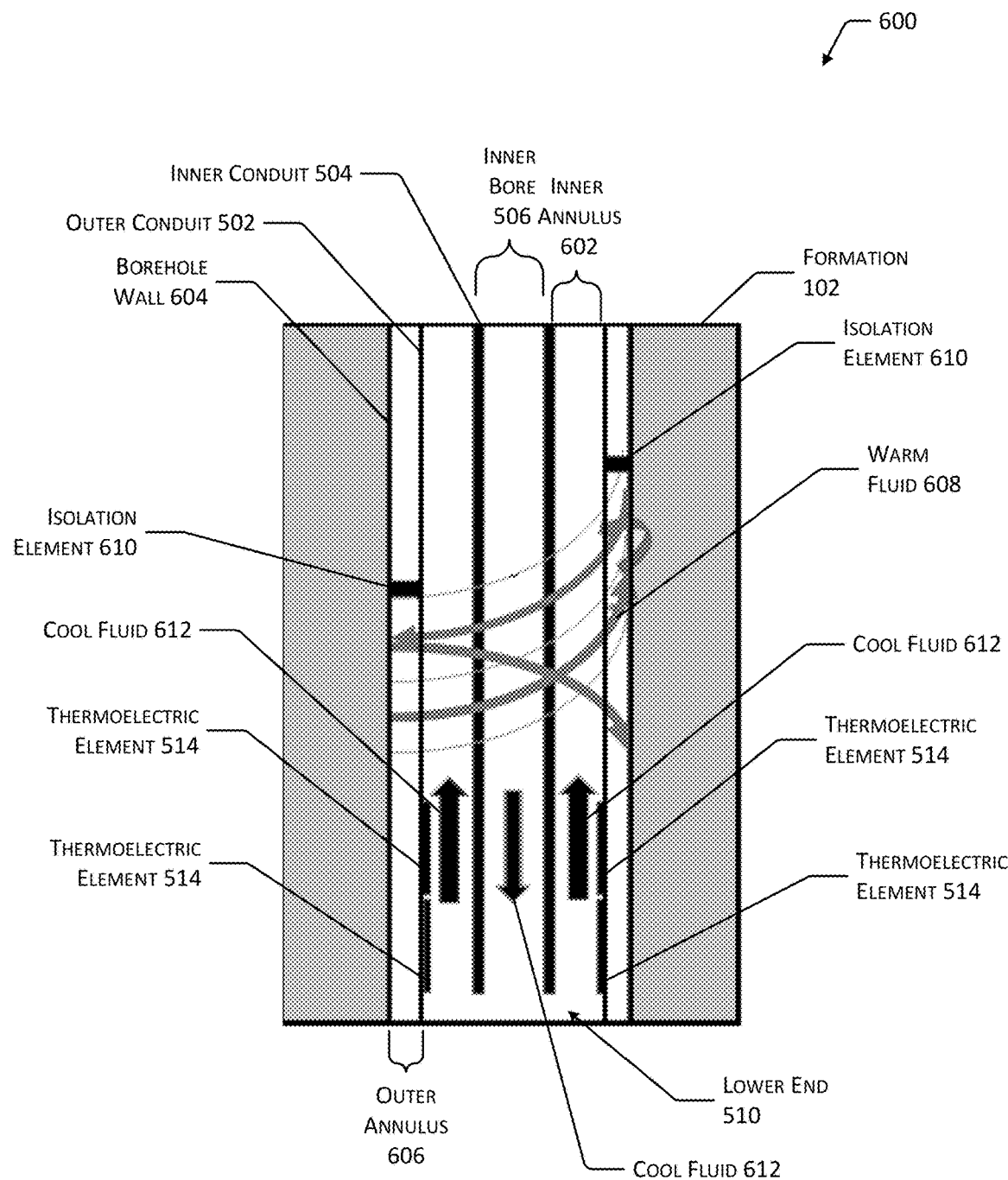
FIG. 6 depicts an implementation of a system for generating geothermal energy using a borehole by circulating fluid within a downhole environment.

FIG. 6 depicts an implementation of a system 600 for generating geothermal energy using a borehole 108 by circulating fluid 512 within a downhole environment. As described with regard to FIGS. 1-4, a borehole 108 may be formed within a formation 102 at least in part using accelerated projectiles 106 to displace or weaken the geologic material of the formation 102. The conduits used to form and isolate the borehole 108, such as a drilling conduit and an exterior casing, may subdivide the borehole 108 into bores and annuli that may be used to flow fluid 512 in uphole and downhole directions.

As described with regard to FIG. 5, an inner conduit 504 and an outer conduit 502 may be positioned within the borehole 108, the inner conduit 504 being located within the outer conduit 502. In some implementations, the borehole 108 may be provided with a diameter greater than that of the outer conduit 502, such as through use of accelerated projectiles 106 that are projected from the drilling conduit at an angle relative thereto or projectiles 106 configured to generate force in a lateral direction relative to the drilling conduit. As such, the inner conduit 504 may separate the inner bore 506 of the borehole 108 from an inner annulus 602, located between the inner conduit 504 and the outer conduit 502. The outer conduit 502 and the borehole wall 604, located external to the outer conduit 502, may define an outer annulus 606.

In some implementations, the outer annulus 606 may be filled with a warm fluid 608, such as a conductive or convective slurry. For example, after the borehole 108 has been extended to a target depth, a graphite slurry or another type of fluid may be injected beyond the lower end of the outer conduit 502, or through one or more openings in the outer conduit 502, into the outer annulus 606. The warm fluid 608 may contact the geologic material of the formation 102 and conduct or convect heat from the geologic material toward the outer conduit 502, to facilitate the transfer of heat toward the inner annulus 602. In some implementations, the warm fluid 608 may be circulated, such as through use of a pump, turbine, drill bit, or other fluid-moving apparatus (not shown in FIG. 6) that may be positioned at or near the end of the outer conduit 502. Circulation of the warm fluid 608 may facilitate the distribution of heat evenly along the exterior of the outer conduit 502. For example, circulation of the warm fluid 608 may cause the warm fluid 608 to transfer heat or materials from deeper within the borehole 108 to portions of the outer annulus 606 that are located farther in an uphole direction. In some implementations, one or more isolation elements 610, such as concrete plugs, seals, valves, or other types of barriers or closure mechanisms, may be positioned within the outer annulus 606 to restrict the flow of warm fluid 608 to a selected region of the outer annulus 606.

A cool fluid 612 (e.g., having a temperature less than that of the warm fluid 608) may be provided into the borehole 108 via one of the inner bore 506 or the inner annulus 602, and circulated toward the surface 116 via the other of the inner bore 506 or the inner annulus 602. The cool fluid 612 may be heated by proximity to the warm fluid 608. For example, heat from the warm fluid 608 may be conducted across the outer conduit 502 to the cool fluid 612. The heated cool fluid 612 may be returned to the surface 116, where heat from the cool fluid 612 may be used to generate electrical current. In some implementations, thermoelectric elements 514 may be positioned in the borehole 108, such that the cool fluid 612 and the warm fluid 608 create a thermal gradient across the thermoelectric elements 514. For example, the thermoelectric elements 514 may be positioned on a portion of the outer conduit 502.

Figure 7:
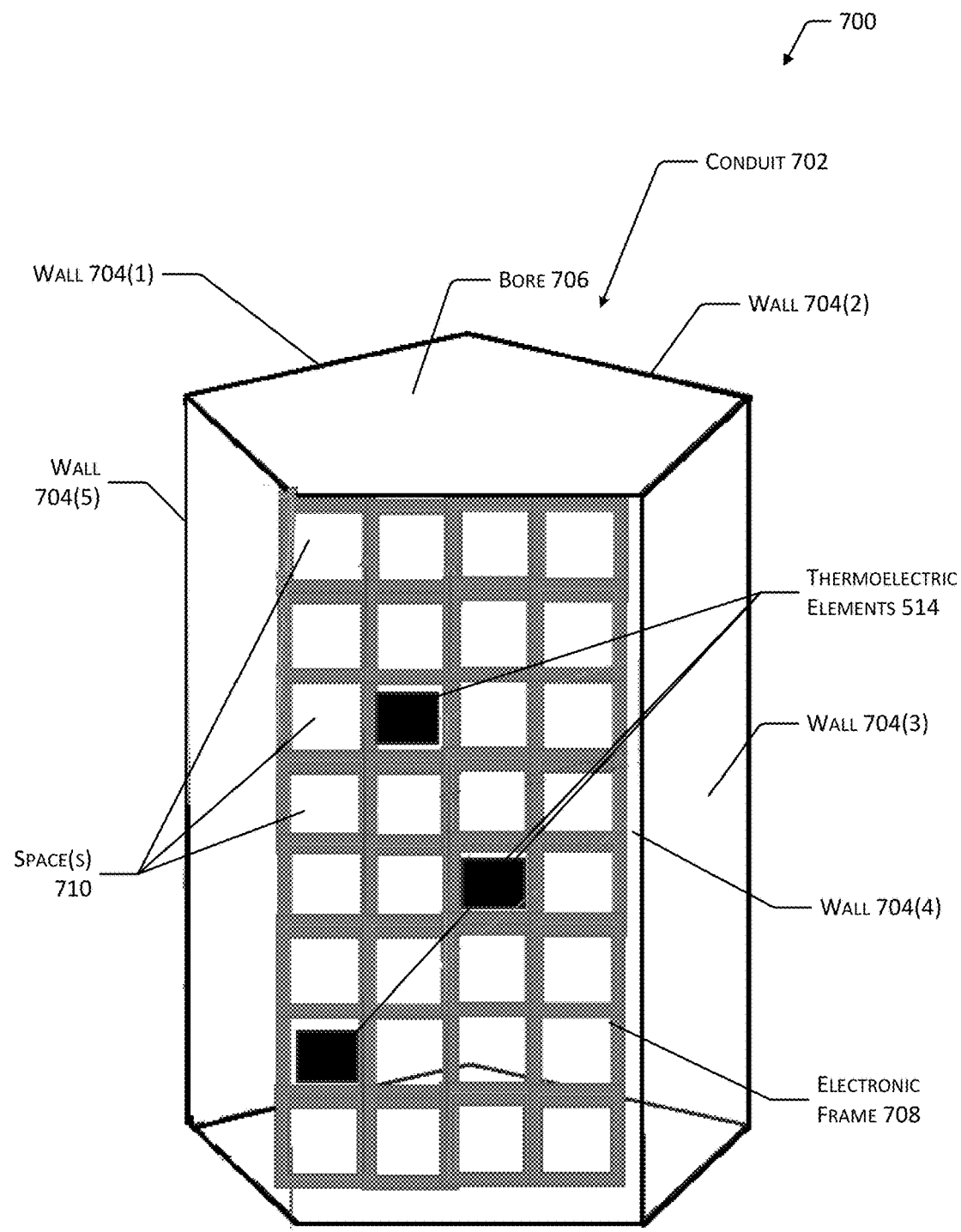
FIG. 7 is a diagram depicting an implementation of a conduit configured to contain thermoelectric elements.

FIG. 7 is a diagram 700 depicting an implementation of a conduit 702 configured to contain thermoelectric elements 514. As discussed previously, a borehole 108 may have any cross-sectional shape, including non-round shapes, due to the ability to accelerate projectiles 106 into geologic material at various angles relative to the axis of a drilling conduit. As such, conduits 702 that are used to form a borehole 108 or inserted therein may not necessarily have round cross-sectional shapes. For example, FIG. 7 depicts a conduit 702 having a pentagonal cross-sectional shape, defined by five walls 704, which in turn define a bore 706 extending through the conduit 702. In some cases, the shape of the conduit 702 relative to the shape of the borehole 108 may facilitate the circulation of fluid 512 within an annulus 508 between the borehole 108 and conduit 702. For example, placement of a conduit 702 having angular surfaces within a round borehole 108 may affect the manner in which fluid 512 within the annulus 508 moves relative to the conduit 702. In some implementations, one or more of the walls 704 may include an electronic frame 708 associated therewith. For example, a wall 704 may be formed from or otherwise integral with the electronic frame 708, or the electronic frame 708 may be attached to the wall 704.

The electronic frame 708 may be formed from electrically conductive materials and configured to conduct current produced by the thermoelectric elements 514 toward the surface 116. In some implementations, the electronic frame 708 may also include or be in electrical communication with electric conditioning components. The electronic frame 708 may be configured to retain thermoelectric elements 514 in a desired position. For example, one implementation of the electronic frame 708 may include a rectangular panel formed from interlocking linear elements to define a grid shape having one or more spaces 710 therein. Each space 710 may be configured to engage or otherwise retain a rectangular thermoelectric element 514. In other implementations, an electronic frame 708 may have other shapes corresponding to conduits 702 that have other cross-sectional shapes. For example, an electronic frame 708 and the thermoelectric elements 514 may have a curvature that corresponds to that of a cylindrical conduit 702. In some implementations, one or more electronic frames 708 may be connected together, in series or in parallel. Use of electronic frames 708 may enable particular thermoelectric elements 514 or particular electronic frames 708 to be added, removed, or replaced in a modular manner, such as at times when one or more thermoelectric elements 514 or one or more electronic frames 708 become damaged.

An electronic frame 708 may be formed using thermally isolating materials and in some implementations, each space 710 may include an electrical connection, such as a socket, for engaging a thermoelectric element 514. The electronic frame 708 may also include a bus connecting adjacent thermoelectric elements 514 or connecting thermoelectric elements 514 to power transmitting elements. For example, in one or more of the spaces 710, a power conditioning unit or power converter may be placed. Continuing the example, a power conditioning unit may covert direct current produced by a thermoelectric element 514 into alternating current or may otherwise modify the power generated by the thermoelectric element 514. In implementations where TPV elements are used, a first portion of the spaces 710 may include thermal emitters, while a second portion of the spaces 710 may include photovoltaic cells.

Figure 8:
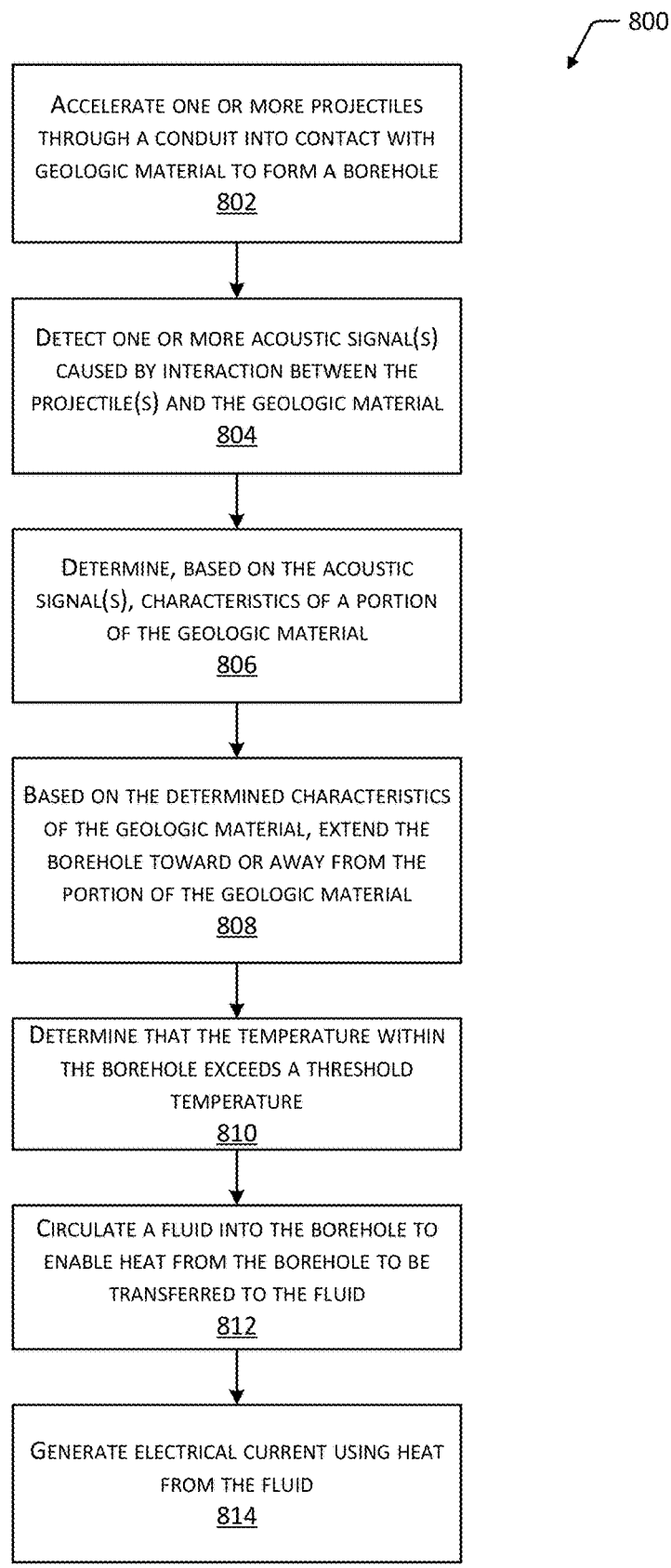
FIG. 8 is a flow diagram illustrating a method for generating a borehole using data determined from acoustic signals.

FIG. 8 is a flow diagram 800 illustrating a method for generating a borehole 108 using data determined from acoustic signals 104. At 802, one or more projectiles 106 may be accelerated through a conduit 702 and into contact with geologic material to form a borehole 108. For example, the method described with regard to FIGS. 2-4 may be used to accelerate projectiles 106 into contact with geologic material to at least partially weaken the material, while a drill bit 202 may be used to bore through the weakened material.

At 804, one or more acoustic signals 104 caused by interaction between the projectile(s) 106 and the geologic material may be detected. For example, as described with regard to FIG. 1, interaction between a projectile 106 and geologic material may cause vibrations within the geologic material that may be detected using one or more acoustic sensors 114. Acoustic sensors 114 may be located within the borehole 108 in which the projectiles 106 are being accelerated, within another borehole 108, or at the surface 116.

At 806, based on the acoustic signals 104, one or more characteristics of a portion of the geologic material may be determined. For example, a projectile 106 may impact the geologic material at a first location, which may cause one or more acoustic signals 104 to be projected outward from the first location. An acoustic sensor 114 at a second location may detect the acoustic signal 104. Based on characteristics of the detected acoustic signal 104, characteristics of the geologic material between the first location and the second location, such as hardness, porosity, and the presence of fractures 118 may be determined. Use of multiple acoustic sensors 114 at different locations may enable characteristics of different regions of the geologic material to be determined based on the acoustic signals 104 that propagate through the respective portions of the geologic material.

At 808, based on the determined characteristics of the geologic material, the borehole 108 may be extended toward or away from the region of the geologic material for which the characteristics were determined. For example, if geologic material includes a hardness greater than a threshold hardness or a porosity less than a threshold porosity, these characteristics may impede extension of the borehole 108, and the borehole 108 may be extended away from the region of the geologic material. If the geologic material includes a hardness less than a threshold hardness or a porosity greater than a threshold porosity, these characteristics may facilitate extension of the borehole 108, and the borehole 108 may be extended toward the region of the geologic material. If the geologic material includes fractures 118 having a size greater than a threshold size, the fractures 118 may be used to extract heat or materials from the geologic material, to flow materials between multiple boreholes 108, or to create a lateral bore between multiple boreholes 108, and the borehole 108 may be extended toward the fractures 118.

At 810, the temperature within the borehole 108, such as at a current depth thereof, may be determined to exceed a threshold temperature. The threshold temperature may be selected as a temperature suitable for generation of a selected quantity of thermal energy, such as a temperature that exceeds a current or average ambient temperature at the surface 116 by at least a selected amount, or that exceeds the current or average temperature of a circulating fluid 512 by at least a selected amount.

At 812, a fluid 512 may be circulated into the borehole 108 to enable heat from the borehole 108 to be transferred to the fluid 512. As described with regard to FIGS. 5 and 6, fluid 512 within one or more conduits 702 may pass within proximity of adjacent geologic material, which may enable heat from the geologic material to be transferred to the fluid 512.

At 814, electrical current may be generated using heat from the fluid 512. In some implementations, heated fluid 512 may be flowed to the surface 116, where heat from the fluid 512 may be used to generate electrical current. In other implementations, passage of fluid 512 proximate to a thermoelectric element 514 may create a temperature differential responsive to which the thermoelectric element 514 may generate electrical current for conduction toward an electrical load.

Figure 9:
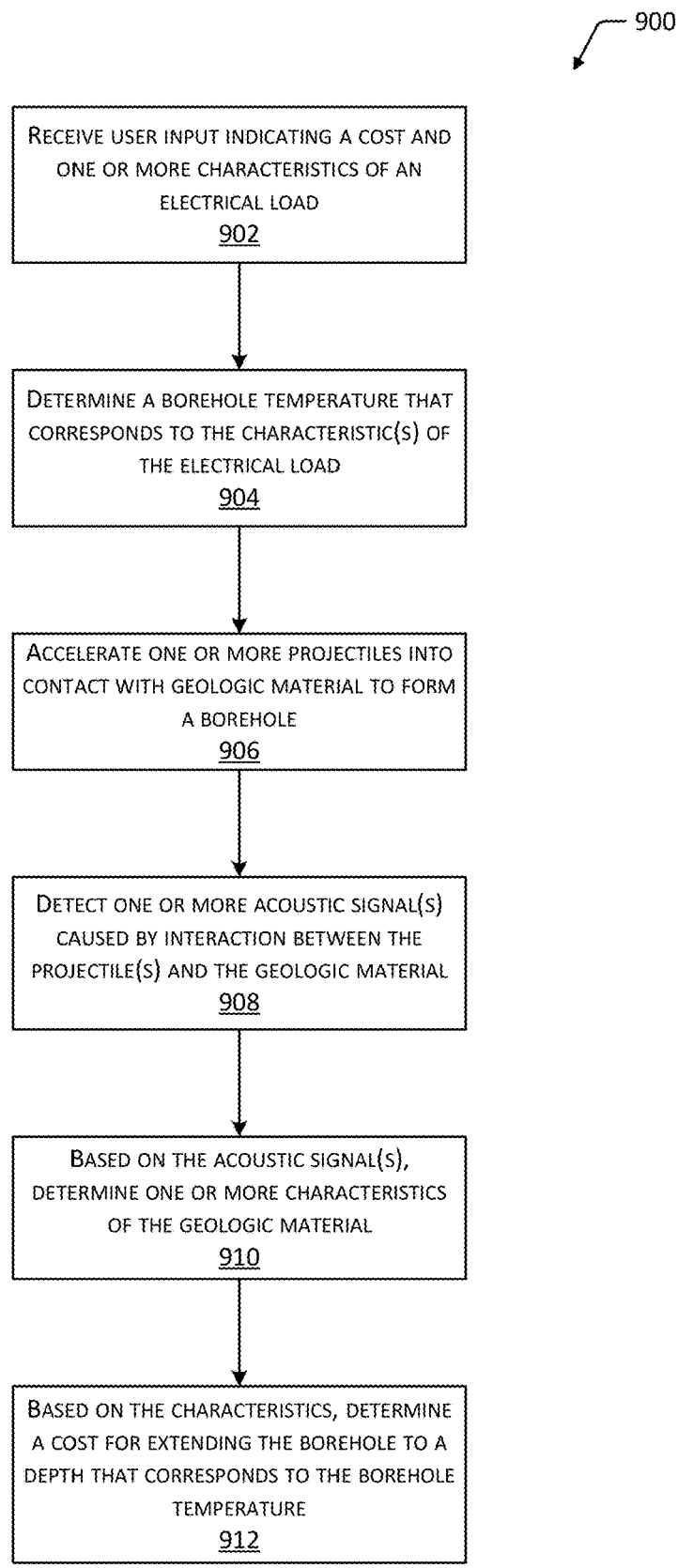
FIG. 9 is a flow diagram illustrating a method for generating a borehole based on user constraints and data determined from acoustic signals.

FIG. 9 is a flow diagram 900 illustrating a method for generating a borehole 108 based on user constraints and data determined from acoustic signals 104. At block 902, user input indicating a cost and one or more characteristics of an electrical load may be received. For example, user input may specify a quantity of thermal energy from a borehole 108 that may be used to at least partially supply an electrical load. The user input may also specify a budget, a desired cost per unit of energy, or other economic constraints.

At 904, a borehole temperature that corresponds to the characteristics of the electrical load may be determined. For example, based on a diameter of a borehole 108 to be generated and a quantity and cost of geothermal energy indicated by the user input, a borehole temperature that may be used to generate geothermal energy that corresponds to the indicated quantity and cost may be determined.

At 906, one or more projectiles 106 may be accelerated into contact with the geologic material to form a borehole 108. For example, the methods described with regard to FIGS. 2-4 may be used to generate at least a portion of a borehole 108.

At 908, one or more acoustic signals 104 caused by interaction between the projectile(s) 106 and the geologic material may be detected. As described with regard to FIG. 1, acoustic signals 104 may include vibrations that propagate through the geologic material, caused by impact or other interactions between the projectile(s) 106 and the geologic material. Acoustic sensors 114 at one or more locations may detect the acoustic signals 104 that propagate in various directions from the location at which a projectile 106 interacts with geologic material.

At 910, based on the acoustic signal(s) 104, one or more characteristics of the geologic material, such as hardness, porosity, or the presence of fractures 118 may be determined.

At 912, based on the determined characteristics, a cost for extending the borehole 108 to a depth that corresponds to the target borehole temperature may be determined. For example, penetrating through geologic material having a high hardness or low porosity may require greater time and materials than penetrating through a softer or more porous material. Based on the determined characteristics, a cost per unit of distance to extend a borehole 108 may be determined, which may be used to determine a cost to extend a borehole 108 to a target depth associated with a borehole temperature. In some cases, costs associated with generation of a borehole 108 may be offset by value associated with geothermal energy that may be produced using the borehole 108.

The following clauses provide additional description of various embodiments and structures:

Clause 1: A method comprising: accelerating a first projectile through a conduit, wherein the first projectile contacts a first location of geologic material to form a borehole and interaction between the first projectile and the geologic material at the first location generates an acoustic signal; detecting the acoustic signal using an acoustic sensor at a second location; determining, based on the acoustic signal, one or more characteristics of a region of the geologic material between the first location and the second location; and controlling formation of the borehole in a direction toward or away from the region of the geologic material based on the one or more characteristics.

Clause 2: The method of clause 1, wherein the one or more characteristics include one or more of a hardness of the geologic material or a porosity of the geologic material, the method further comprising: determining one or more of: the hardness exceeds a threshold hardness or the porosity is less than a threshold porosity; wherein controlling formation of the borehole in the direction includes extending the borehole along a path that avoids intersection with the region of the geologic material.

Clause 3: The method of clause 1 or 2, wherein the one or more characteristics include one or more of a hardness of the geologic material or a porosity of the geologic material, the method further comprising: determining one or more of: the hardness is less than a threshold hardness or the porosity is greater than a threshold porosity; wherein controlling formation of the borehole in the direction includes extending the borehole along a path that intersects the region of the geologic material.

Clause 4: The method of any of clauses 1-3, wherein the one or more characteristics include one or more fractures within the geologic material having a size greater than a threshold size and extending the borehole in the direction includes extending the borehole along a path that intersects at least one fracture of the one or more fractures.

Clause 5: The method of clause 4, wherein the first projectile is configured to impart a longitudinal force to the geologic material to extend the borehole, the method further comprising: accelerating a second projectile to a portion of the borehole proximate to the one or more fractures, wherein the second projectile is configured to impart a lateral force to the one or more fractures upon contact with the geologic material to increase a size of the at least one fracture.

Clause 6: The method of any of clauses 1-5, further comprising: determining that a first temperature within the borehole exceeds a threshold temperature; providing a fluid having a second temperature less than the first temperature into the borehole, wherein the fluid is heated to a third temperature greater than the second temperature; circulating the fluid having the third temperature to an upper end of the borehole; and generating electrical current using heat from the fluid having the third temperature.

Clause 7: The method of any of clauses 1-6, wherein at least one thermoelectric element is associated with the first conduit, the method further comprising: providing a fluid to a portion of the borehole having a first temperature, wherein the fluid has a second temperature less than the first temperature, the fluid is positioned on a first side of the thermoelectric element, the portion of the borehole is positioned on a second side of the thermoelectric element opposite the first side, and the thermoelectric element generates electrical current in response to a temperature differential between the first temperature and the second temperature; and conducting electrical current generated by the thermoelectric element toward an upper end of the borehole.

Clause 8: The method of any of clauses 1-7, further comprising: receiving user input indicative of a quantity of thermal energy associated with producing a predetermined quantity of electrical power; determining a threshold temperature to produce the quantity of thermal energy; determining a borehole depth that corresponds to the threshold temperature; and extending the borehole to the borehole depth.

Clause 9: The method of clause 8, further comprising: determining a threshold cost based on one or more of the user input or a value of the quantity of geothermal energy; determining, based on the one or more characteristics of the region of the geological material, a cost for generating the borehole having the borehole depth; and determining that the cost is less than the threshold cost.

Clause 10: A method comprising: accelerating a first projectile into contact with a geologic material, wherein interaction between the first projectile and the geologic material generates an acoustic signal; detecting the acoustic signal using an acoustic sensor; determining, based on the acoustic signal, one or more fractures within a region of the geologic material; and extending a first borehole to intersect at least one fracture of the one or more fractures.

Clause 11: The method of clause 10, further comprising: accelerating a second projectile to a portion of the first borehole proximate to the one or more fractures, wherein interaction between the second projectile and the geologic material imparts a force to at least a subset of the one or more fractures to enhance the at least a subset of the one or more fractures.

Clause 12: The method of clause 10 or 11, further comprising: providing a fluid having a first temperature into a portion of the first borehole proximate to the one or more fractures, wherein the portion of the borehole has a second temperature greater than the first temperature and the fluid is heated to a third temperature greater than the first temperature; circulating the fluid having the third temperature away from the portion of the first borehole; and generating electrical current using heat from the fluid having the third temperature.

Clause 13: The method of any of clauses 10-12, further comprising: extending a second borehole toward the portion of the geologic material within the threshold distance of the one or more fractures; forming a lateral bore extending between the first borehole and the second borehole, wherein the lateral bore at least partially intersects at least one fracture of the one or more fractures; providing a fluid having a first temperature in a downhole direction into the first borehole; circulating the fluid through the lateral bore into the second borehole; circulating the fluid out from the second borehole in an uphole direction, wherein passage through one or more of the first borehole, the lateral bore, or the second borehole heats the fluid to a second temperature greater than the first temperature; and generating electrical current using heat from the fluid having the second temperature.

Clause 14: The method of any of clauses 10-13, further comprising: extending a second borehole toward the portion of the geologic material, wherein the second borehole intersects the at least one fracture of the one or more fractures; providing a fluid having a first temperature in a downhole direction into the first borehole; circulating the fluid through the at least a subset of the one or more fractures into the second borehole; circulating the fluid out from the second borehole in an uphole direction, wherein passage of the fluid heats the fluid to a second temperature greater than the first temperature; and generating electrical current using heat from the fluid having the second temperature.

Clause 15: A system comprising: a first conduit positioned within geologic material surrounding a borehole, wherein the geologic material is proximate to an exterior surface of the first conduit and the geologic material has a first temperature; a second conduit positioned within the first conduit, wherein a first annulus is defined between the first conduit and the second conduit; a first fluid moving device configured to circulate fluid having a second temperature less than the first temperature into the borehole via one of the first conduit or the first annulus and out from the borehole via the other of the first conduit or the annulus, wherein circulation of the fluid through the first annulus heats the fluid to a third temperature greater than the second temperature; and a power generating device configured to generate electrical current using heat from the fluid having the third temperature.

Clause 16: The system of clause 15, wherein the first conduit is spaced from a wall of the borehole to define a second annulus, the system further comprising: a second fluid moving device configured to circulate borehole materials within the second annulus to maintain a portion of the geologic material proximate to the exterior surface of the first conduit within a threshold temperature of the first temperature.

Clause 17: The system of clause 16, further comprising: at least one isolation element within the second annulus to restrict circulation of the borehole materials by the second fluid moving device to a region proximate to the exterior surface of the first conduit.

Clause 18: The system of any of clauses 15-17, wherein the power generating device includes at least one thermoelectric element having a first side facing the first conduit and a second side facing the first annulus, wherein the fluid within the one of the first conduit or the first annulus has the second temperature and the fluid within the other of the first conduit or the first annulus has the third temperature to cause the at least one thermoelectric element to generate the electrical current.

Clause 19: The system of clause 18, further comprising: an electronic frame associated with the first conduit, wherein the electronic frame contains the at least one thermoelectric element and is configured to conduct the electrical current toward a surface of the borehole.

Clause 20: The system of claim 19, further comprising: one or more power conditioning elements associated with the electronic frame and in electrical communication with the at least one thermoelectric element to modify one or more of a power, a frequency, a phase, an amperage, or a voltage of the electrical current.

Those having ordinary skill in the art will readily recognize that certain steps or operations illustrated in the figures above can be eliminated, combined, subdivided, executed in parallel, or taken in an alternate order. Moreover, the methods described above may be implemented using one or more software programs for a computer system and are encoded in a computer-readable storage medium as instructions executable on one or more processors. Separate instances of these programs can be executed on or distributed across separate computer systems.

Although certain steps have been described as being performed by certain devices, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method comprising:
accelerating a first projectile through a conduit, wherein the first projectile contacts geologic material at a first location to form a borehole, and an interaction between the first projectile and the geologic material at the first location generates an acoustic signal;
detecting the acoustic signal using an acoustic sensor at a second location;
determining, based on the acoustic signal, one or more characteristics of a region of the geologic material between the first location and the second location;
based on the one or more characteristics, controlling formation of the borehole in one or more of: a first direction that is toward the region of the geologic material or a second direction that is away from the region of the geologic material;
circulating a material from within the borehole toward a surface of the borehole;
determining that a first temperature of the material exceeds a threshold temperature; and
based on the first temperature exceeding the threshold temperature, providing a fluid having a second temperature less than the first temperature into the borehole for generation of electrical power, wherein:
the fluid having the second temperature is positioned on a first side of a thermoelectric element,
a portion of the borehole having the first temperature is positioned on a second side of the thermoelectric element, and
the thermoelectric element generates the electrical power based on a temperature differential between the first temperature and the second temperature.

2. The method of claim 1, wherein the one or more characteristics include one or more of: a hardness of the geologic material or a porosity of the geologic material, the method further comprising:
determining one or more of: the hardness exceeds a threshold hardness or the porosity is less than a threshold porosity;
wherein controlling formation of the borehole includes extending the borehole along a path that avoids intersection with the region of the geologic material.

3. The method of claim 1, wherein the one or more characteristics include one or more of: a hardness of the geologic material or a porosity of the geologic material, the method further comprising:
determining one or more of: the hardness is less than a threshold hardness or the porosity is greater than a threshold porosity;
wherein controlling formation of the borehole includes extending the borehole along a path that intersects the region of the geologic material.

4. The method of claim 1, wherein the one or more characteristics include one or more fractures within the geologic material having a size greater than a threshold size, and controlling formation of the borehole includes extending the borehole along a path that intersects at least one fracture of the one or more fractures.

5. The method of claim 4, wherein the first projectile is configured to impart a first force to the geologic material to extend the borehole, the method further comprising:
accelerating a second projectile to a portion of the borehole proximate to the one or more fractures, wherein a second force imparted by the second projectile to the geologic material increases a size of the at least one fracture.

6. The method of claim 1, wherein controlling the formation of the borehole includes accelerating a second projectile to contact the geologic material, and circulating the material from within the borehole toward a surface of the borehole includes circulating material generated from an interaction between the second projectile and the geologic material.

7. The method of claim 1, further comprising:
receiving user input indicative of one or more of: a quantity of thermal energy or a quantity of electrical power; and
determining the threshold temperature based on the one or more of the quantity of thermal energy or the quantity of electrical power.

8. The method of claim 7, further comprising:
determining a borehole depth that corresponds to the threshold temperature; and
extending the borehole to the borehole depth.

9. A method comprising:
accelerating a first projectile into contact with a geologic material, wherein interaction between the first projectile and the geologic material generates an acoustic signal;
detecting the acoustic signal using an acoustic sensor;
determining, based on the acoustic signal, one or more fractures within a region of the geologic material;
accelerating one or more second projectiles into contact with the geologic material to extend a first borehole to intersect at least one fracture of the one or more fractures;

circulating material generated from an interaction between at least one of the one or more second projectiles and the geologic material from within the first borehole toward a surface of the first borehole;

determining that a first temperature of the material exceeds a threshold temperature; and based on the first temperature exceeding the threshold temperature, providing a fluid having a second temperature less than the first temperature into the first borehole for generation of electrical power using a temperature differential between the fluid and the first borehole.

10. The method of claim 9, further comprising:
accelerating a third projectile to a portion of the first borehole proximate to the one or more fractures, wherein a force imparted by the third projectile to the geologic material further imparts a force to at least a subset of the one or more fractures.

11. The method of claim 9, wherein the fluid having the second temperature is heated to a third temperature greater than the second temperature, the method further comprising:
circulating the fluid having the third temperature away from a portion of the first borehole for generation of the electrical power using heat from the fluid having the third temperature.

12. The method of claim 9, further comprising:
extending a second borehole toward a portion of the geologic material within a threshold distance of the one or more fractures;
forming a lateral bore extending between the first borehole and the second borehole, wherein the lateral bore at least partially intersects at least one fracture of the one or more fractures;
circulating the fluid through the lateral bore into the second borehole; and
circulating the fluid out from the second borehole in an uphole direction, wherein passage through one or more of the first borehole, the lateral bore, or the second borehole heats the fluid to a third temperature greater than the second temperature for generation of the electrical power using heat from the fluid having the third temperature.

13. The method of claim 9, further comprising:
extending a second borehole toward a portion of the geologic material, wherein the second borehole intersects at least one fracture of the one or more fractures;
circulating the fluid through at least a subset of the one or more fractures into the second borehole; and
circulating the fluid out from the second borehole in an uphole direction, wherein passage of the fluid heats the fluid to a third temperature greater than the second temperature for generation of the electrical power using heat from the fluid having the third temperature.

14. The method of claim 9, wherein the fluid having the second temperature is positioned on a first side of a thermoelectric element, a portion of the first borehole having the first temperature is positioned on a second side of the thermoelectric element opposite the first side, and the thermoelectric element generates the electrical power in response to the temperature differential between the first temperature and the second temperature.

15. A system comprising:
a conduit having a first end proximate to geologic material at a first location;
a first projectile within the conduit, wherein the first projectile exits the conduit to interact with the geologic material and generate an acoustic signal indicative of a characteristic of the geologic material, and material from interaction between the first projectile and the geologic material is circulated toward a second end of the conduit opposite the first end;
an acoustic detector at a second location, wherein the acoustic detector receives the acoustic signal;
a temperature sensor that determines a first temperature of the material;
a thermoelectric material within the conduit for generating electrical power using a temperature differential;
one or more non-transitory computer-readable storage media storing computer-executable instructions; and
one or more hardware processors to execute the computer-executable instructions to:
determine that the first temperature is greater than a threshold temperature; and
in response to the first temperature being greater than the threshold temperature, cause circulation of a fluid having a second temperature less than a first temperature into the conduit, wherein the thermoelectric material generates the electrical power using the temperature differential between the first temperature and the second temperature.

16. The system of claim 15, wherein an interaction between the first projectile and the geologic material further generates at least a portion of a first borehole.

17. The system of claim 16, wherein the first location comprises a lower end of the first borehole and the second location is positioned within the first borehole in an uphole direction relative to the first location.

18. The system of claim 16, wherein the first location comprises a lower end of the first borehole and the second location is positioned at an upper surface of the first borehole.

19. The system of claim 16, wherein the first location comprises a lower end of the first borehole and the second location is positioned within a second borehole.

20. The system of claim 15, wherein the conduit includes a ram acceleration assembly to accelerate the first projectile toward the geologic material.

* * * * *